United States Patent [19]
Fijolek et al.

[11] Patent Number: 6,018,767
[45] Date of Patent: Jan. 25, 2000

[54] METHOD AND SYSTEM FOR MANAGING SUBSCRIPTION SERVICES WITH A CABLE MODEM

[75] Inventors: John G. Fijolek, Naperville; Ronald B. Lee, Northbrook; Philip T. Robinson, Barrington; Levent Gun, Lake Forest, all of Ill.

[73] Assignee: 3Com Corporation, Santa Clara, Calif.

[21] Appl. No.: 09/028,404

[22] Filed: Feb. 24, 1998

[51] Int. Cl.$^7$ .............................. G06F 13/00; H04N 7/173
[52] U.S. Cl. ......................... 709/218; 709/225; 709/250; 348/12
[58] Field of Search ..................... 709/217, 218, 709/219, 225, 226, 227, 229, 230, 231, 238, 250; 348/6, 7, 8, 10, 12, 13

[56] References Cited

U.S. PATENT DOCUMENTS

| | | | |
|---|---|---|---|
| 5,347,304 | 9/1994 | Moura et al. | 348/12 |
| 5,442,749 | 8/1995 | Northcutt et al. | 709/219 |
| 5,488,412 | 1/1996 | Majeti et al. | 348/10 |
| 5,583,931 | 12/1996 | Schneider et al. | 379/399 |
| 5,586,121 | 12/1996 | Moura et al. | 370/404 |
| 5,600,717 | 2/1997 | Schneider et al. | 379/399 |
| 5,606,606 | 2/1997 | Schneider et al. | 379/399 |
| 5,608,446 | 3/1997 | Carr et al. | 348/6 |
| 5,623,542 | 4/1997 | Schneider et al. | 379/399 |
| 5,636,211 | 6/1997 | Newlin et al. | 370/465 |
| 5,675,732 | 10/1997 | Majeti et al. | 709/235 |
| 5,761,602 | 6/1998 | Wagner et al. | 455/3.1 |
| 5,778,181 | 7/1998 | Hidary et al. | 709/218 |
| 5,870,134 | 2/1999 | Laubach et al. | 348/12 |

OTHER PUBLICATIONS

"Cable Modem to Customer Premise Equipment Interface Specification (Interim) SP–CMCI–I02–980317", Multimedia Cable Network Systems (MCNS) Holdings, L.P., 1998, pp. ii to 40.
"Operations Support System Interface Specification Baseline Privacy Interface MIB (Interim) SP–OSSI–B–PI–I01–980331", MCNS Holdings, L.P., 1998, pp. ii to 83.
"Cable Modem Termination System–Network Side Interface Specification (Interim Specification) SP–CMTS–N–SII01–960702", MCNS Holdings, L.P., 1996, pp. ii to 13.
"Removable Security Module Interace Specification (Interim Specification) SP–RSMI–I01–980204", MCNS Holdings, L.P., 1997, pp. ii to 48.
"Baseline Privacy Interface Specification (Interim) SP–B–PI–I01–970922", MCNS Holdings, L.P., 1997, pp. ii to 66.
"Operations Support System Interface Specification (Interim) SP–OSSII01–970403", MCNS Holdings, L.P., 1997, pp. 1 to 30.

(List continued on next page.)

*Primary Examiner*—Viet D. Vu
*Attorney, Agent, or Firm*—McDonnell Boehnen Hulbert & Berghoff; Stephen Lesavich

[57] ABSTRACT

A method and system for managing network services such as subscription services from a cable modem in a data-over-cable system. The cable modem receives an initialization message on a cable television connection indicating what services are available on a data network. The cable modem uses a connection to a public switched telephone network in the data-over-cable system to send requests to and receive responses from the data network. A telephony remote access concentrator on the public switched telephone network provides an additional security mechanism by not allowing a cable modem to subscribe to unauthorized services. Using the public switched telephone network does not compromise the security of the cable television network. In addition, the public switched telephone network is used to provide administrative support to the cable television network on lower bandwidth connections by providing an administrative pathway outside of the higher bandwidth cable television connections.

24 Claims, 28 Drawing Sheets

OTHER PUBLICATIONS

"Radio Frequency Interface Specification (Interim Specification) SP–RFI–I02–971008", MCNS Holdings, L.P., 1997, pp. ii to 186.

"Cable Modem Telephony Return Interface Specification (Interim) SP–CMTRI–I01–970804", MCNS Holdings, L.P., 1997, pp. ii to 74.

"Security System Specification (Interim Specification) SP–SSI–I01–970506", MCNS Holdings, L.P.,1997, pp. ii to 103.

"Internet Engineering Task Force, Request for Comments 2131, Dynamic Host Configuration Protocol (DHCP)", Mar. 1997, pp. 1–42.

S. Adiraju, J. Fijolek, IPCDN Telephony Return MIB, Internet Engineering Task Force, "IETF," Internet Draft, "<draft–ietf–ipcdn–tri–mib–oo.1.txt>," Mar. 23, 1998, pp. 1 to 26.

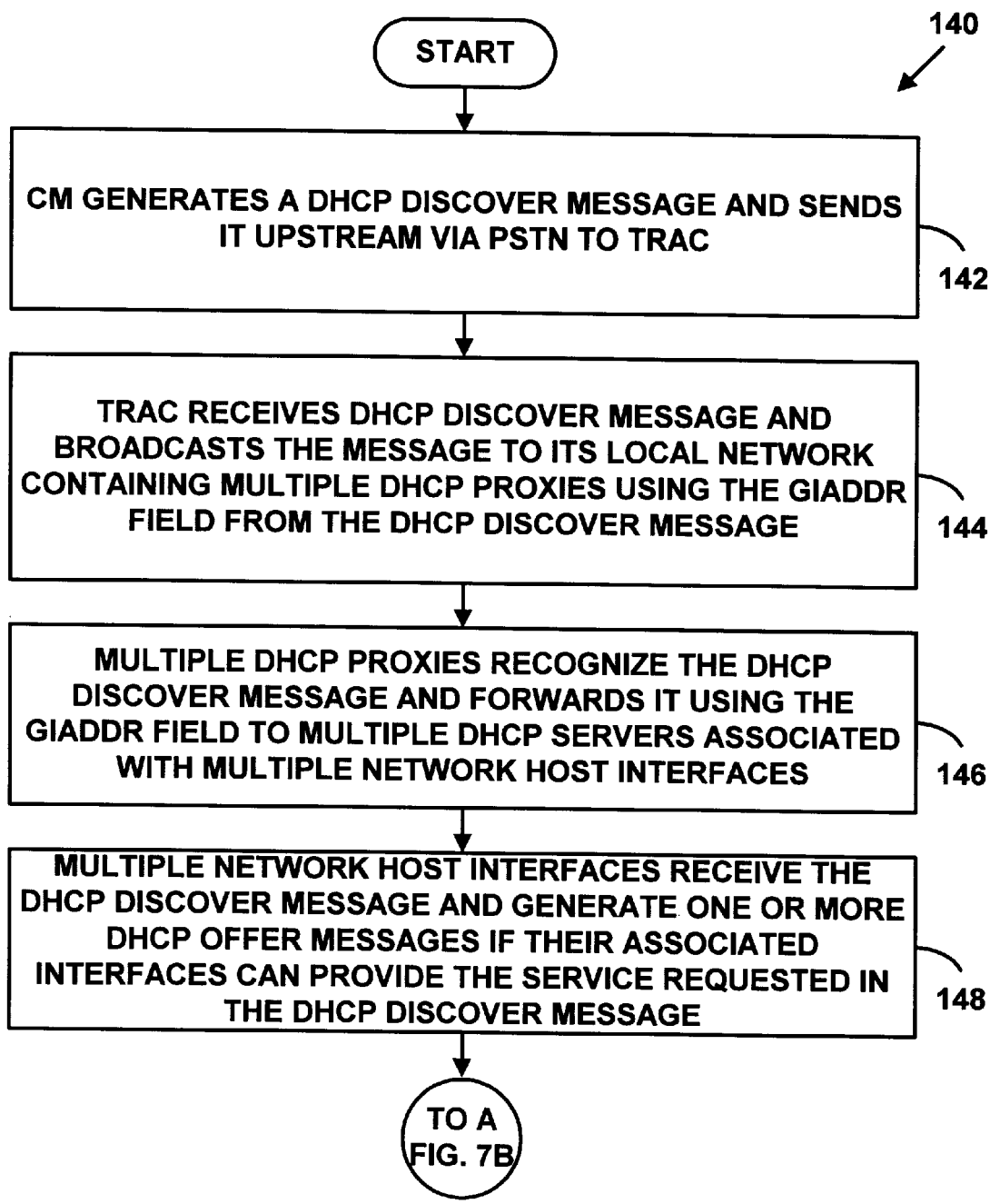

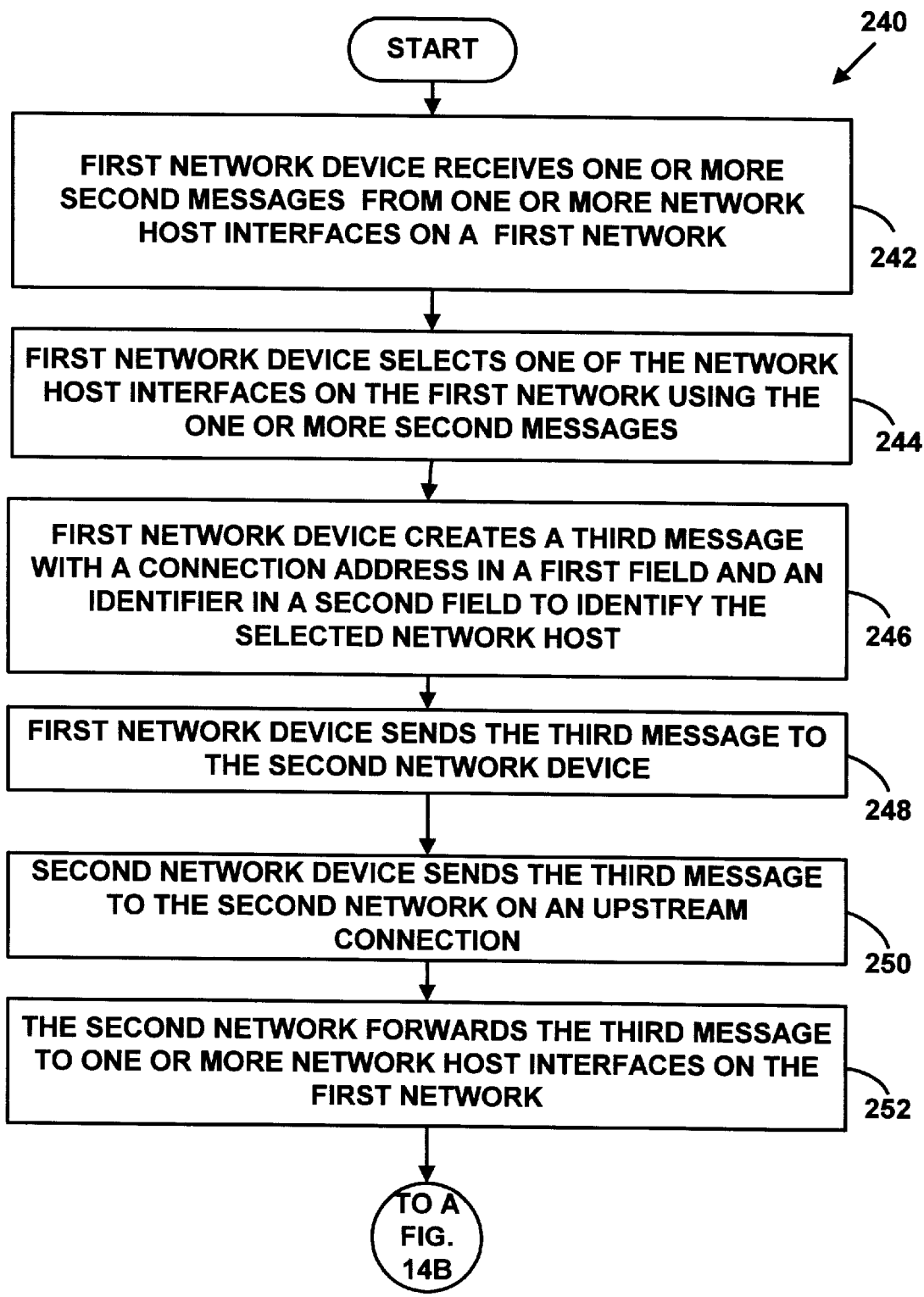

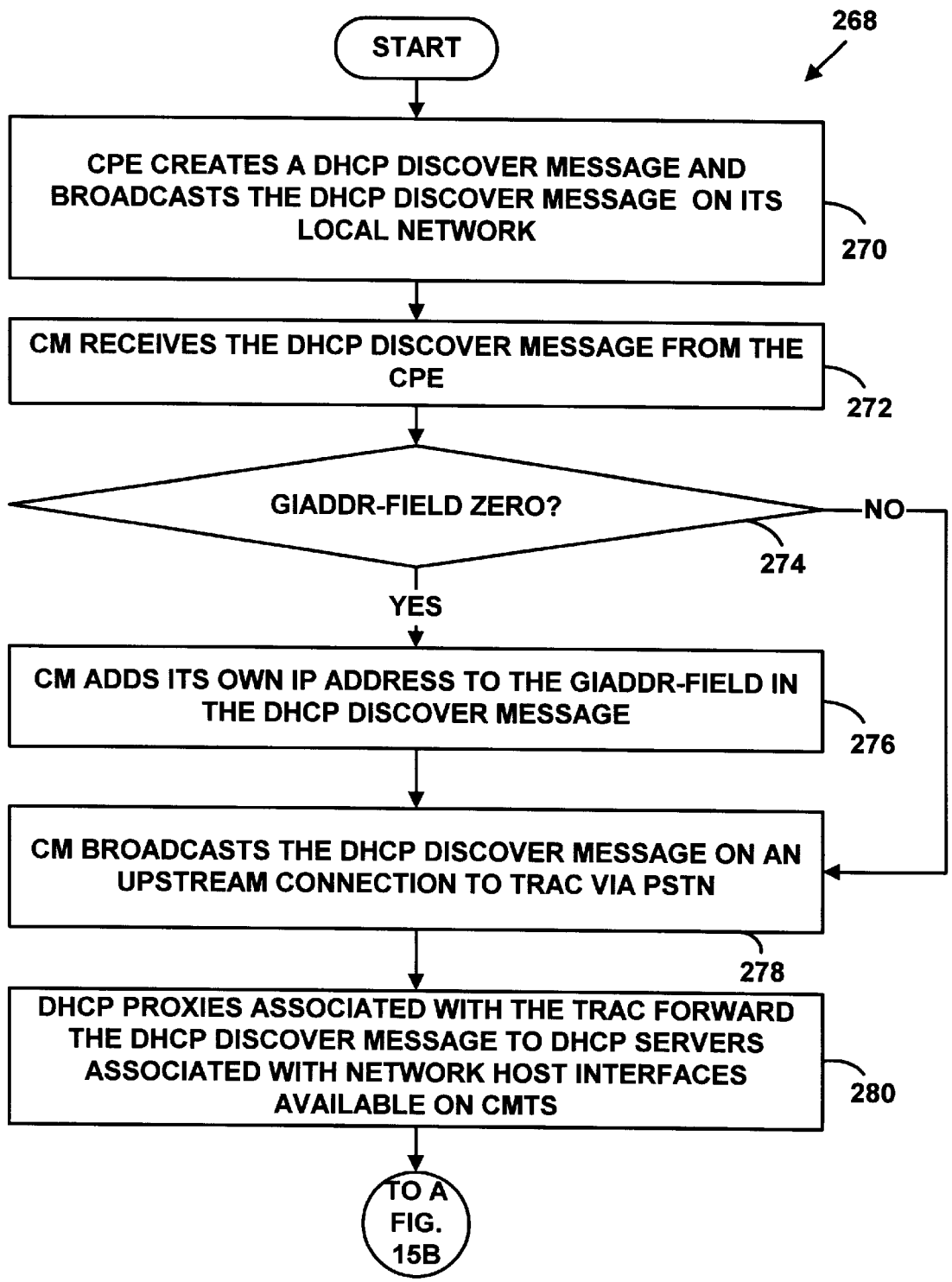

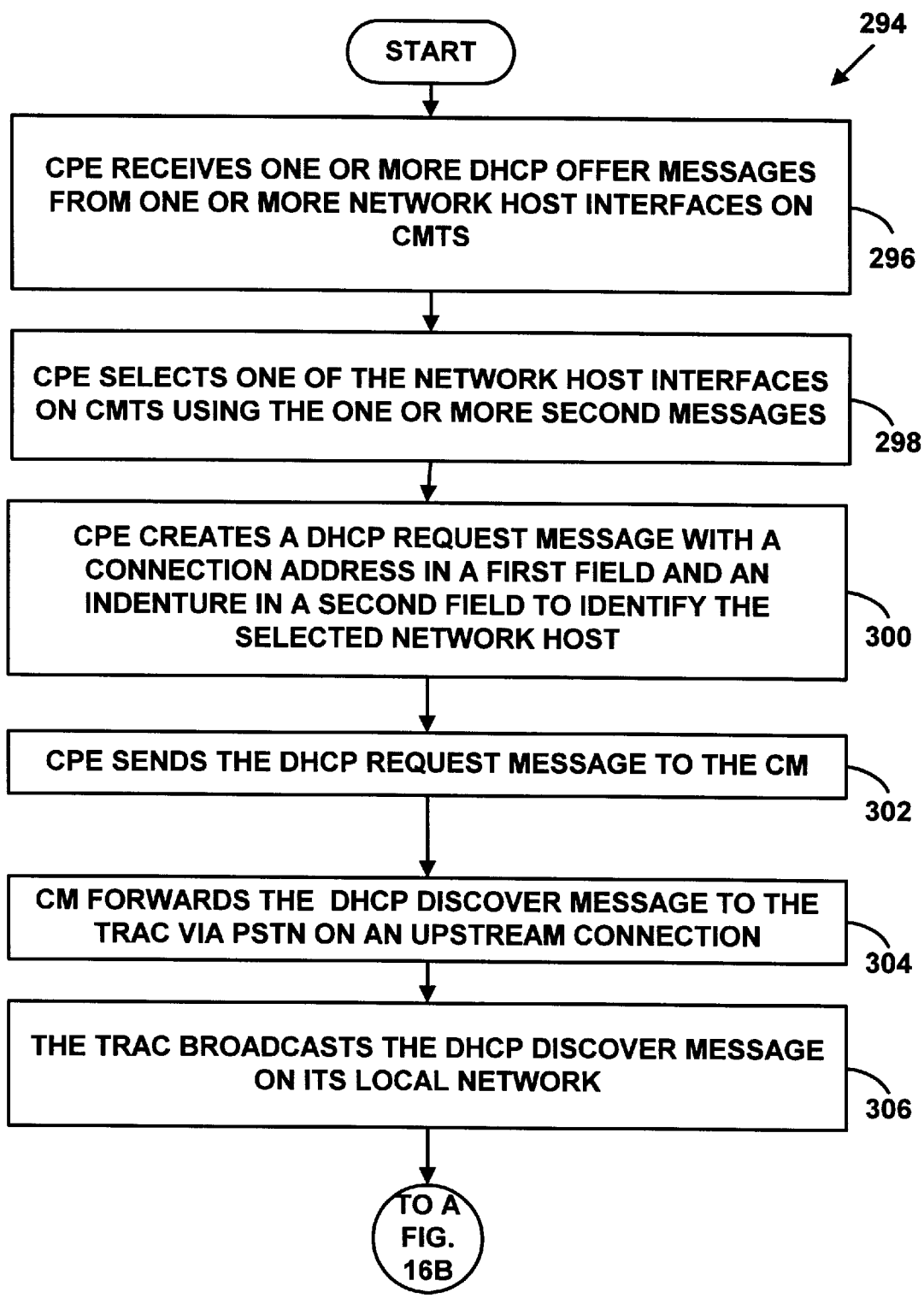

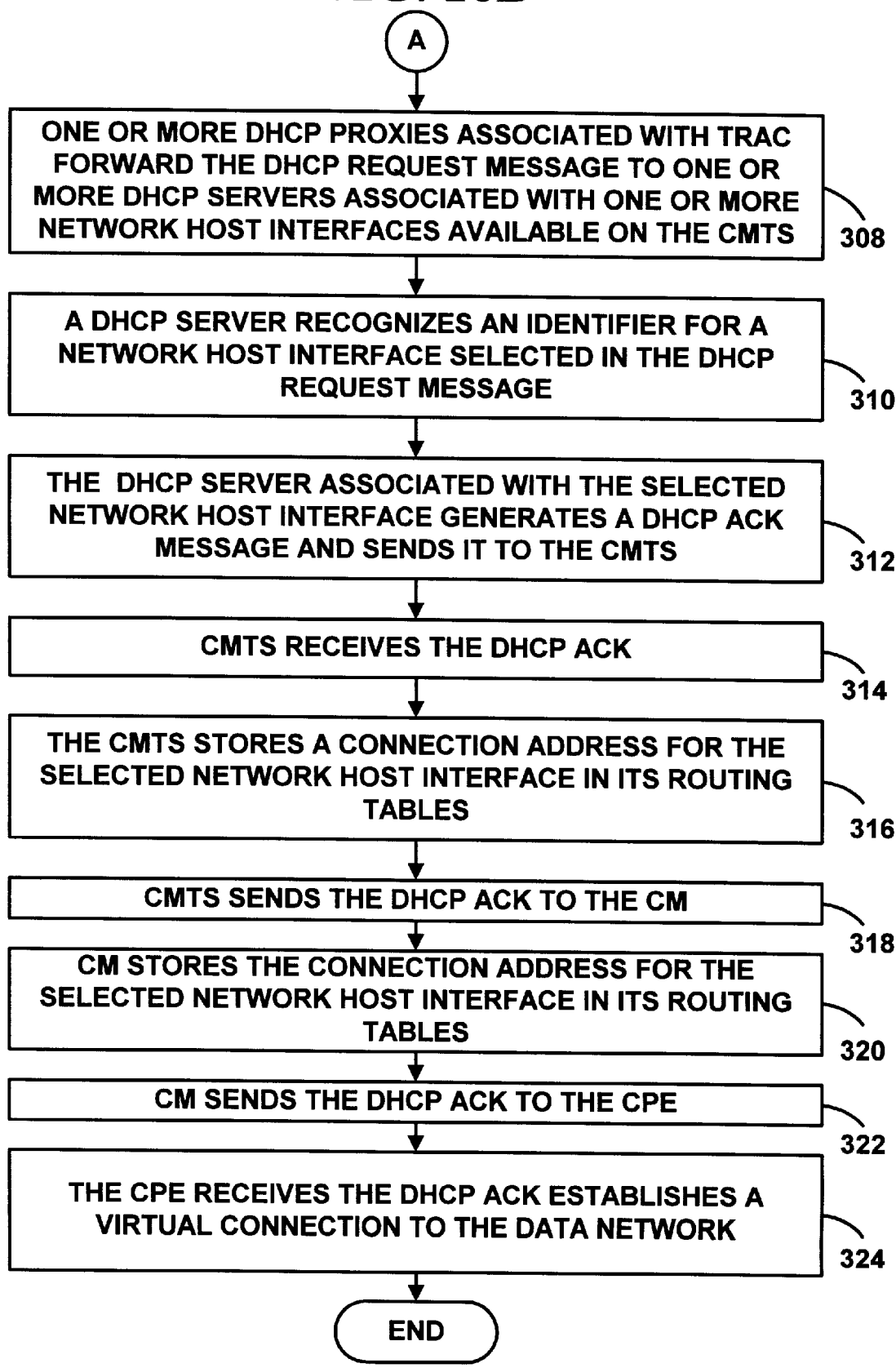

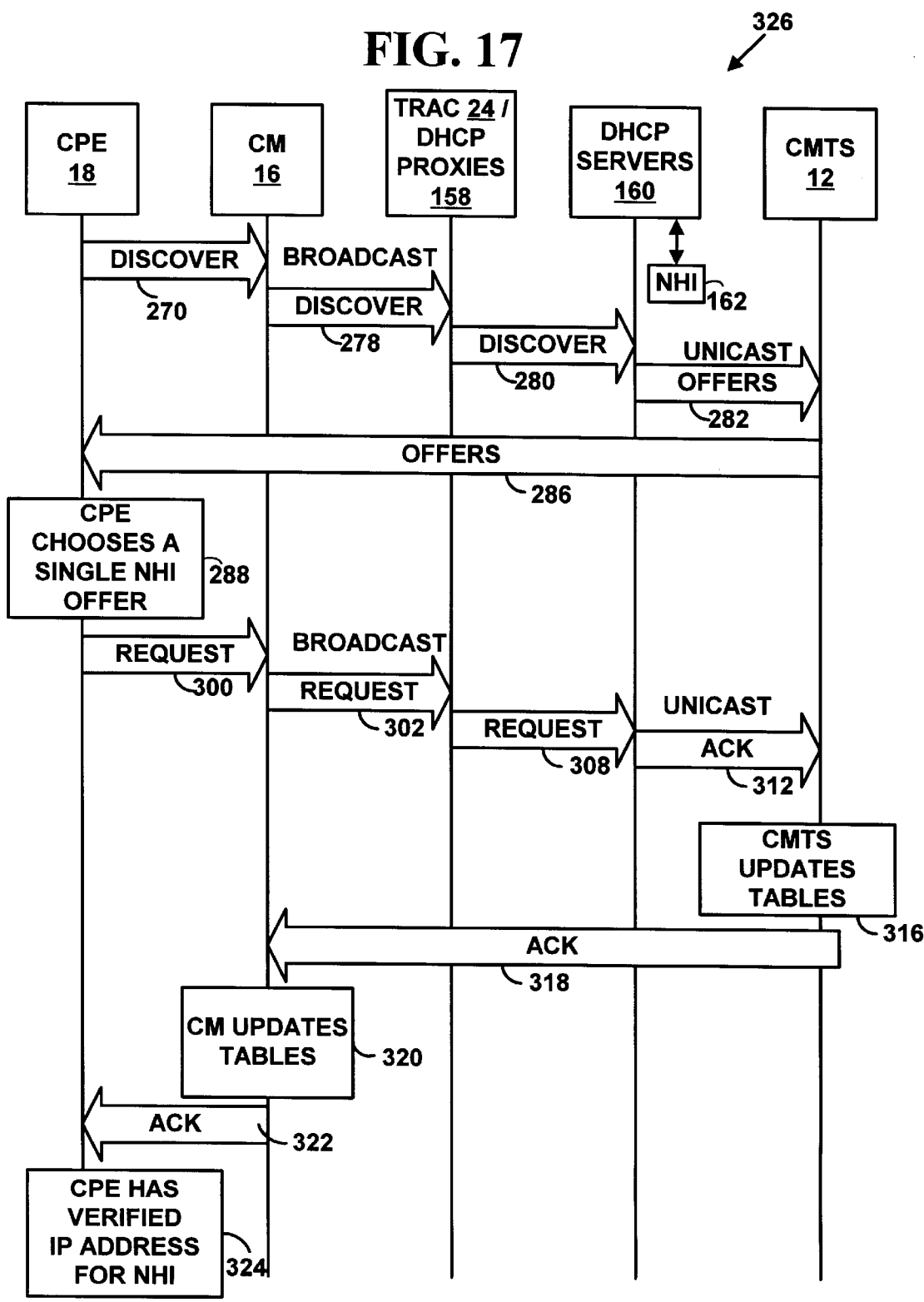

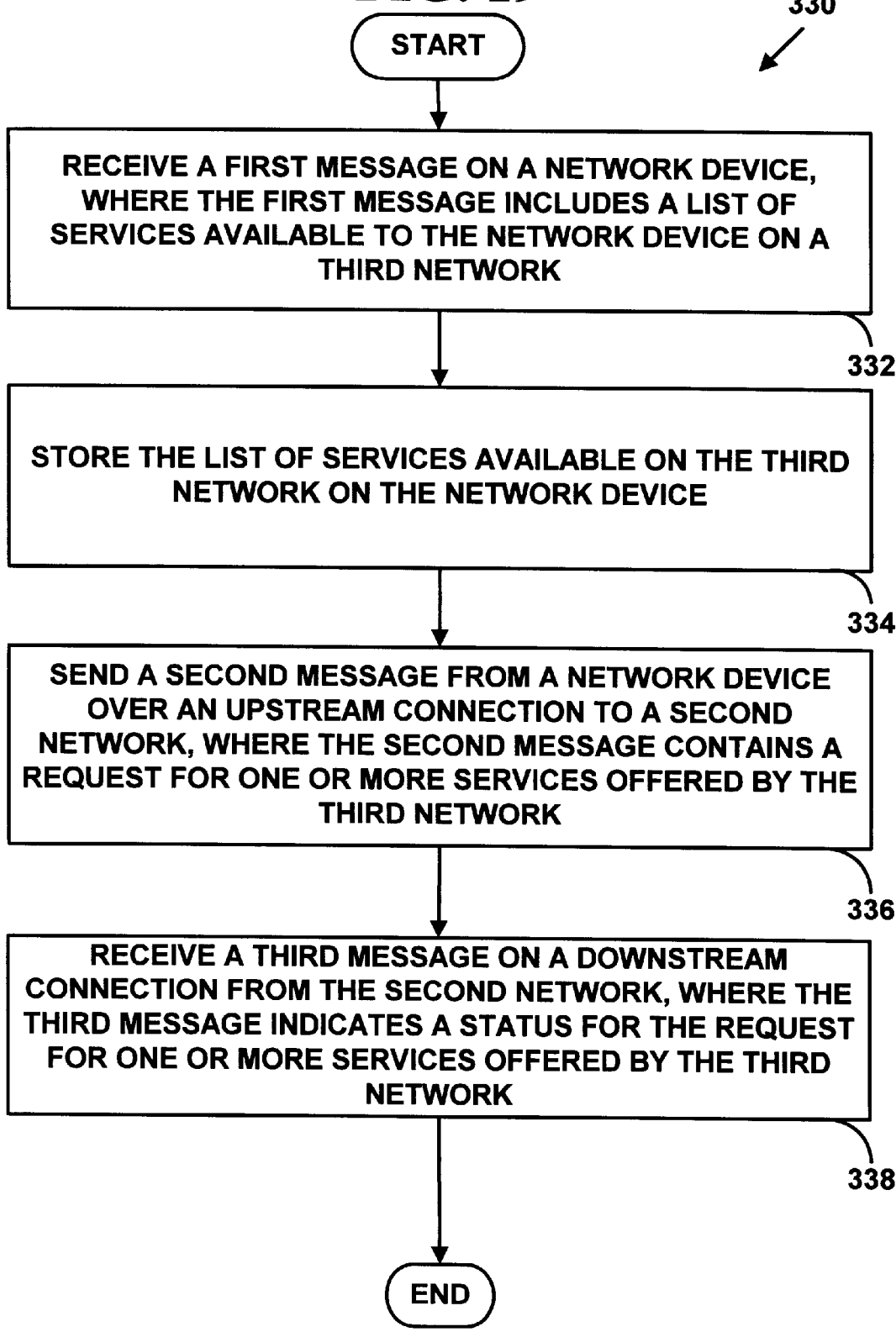

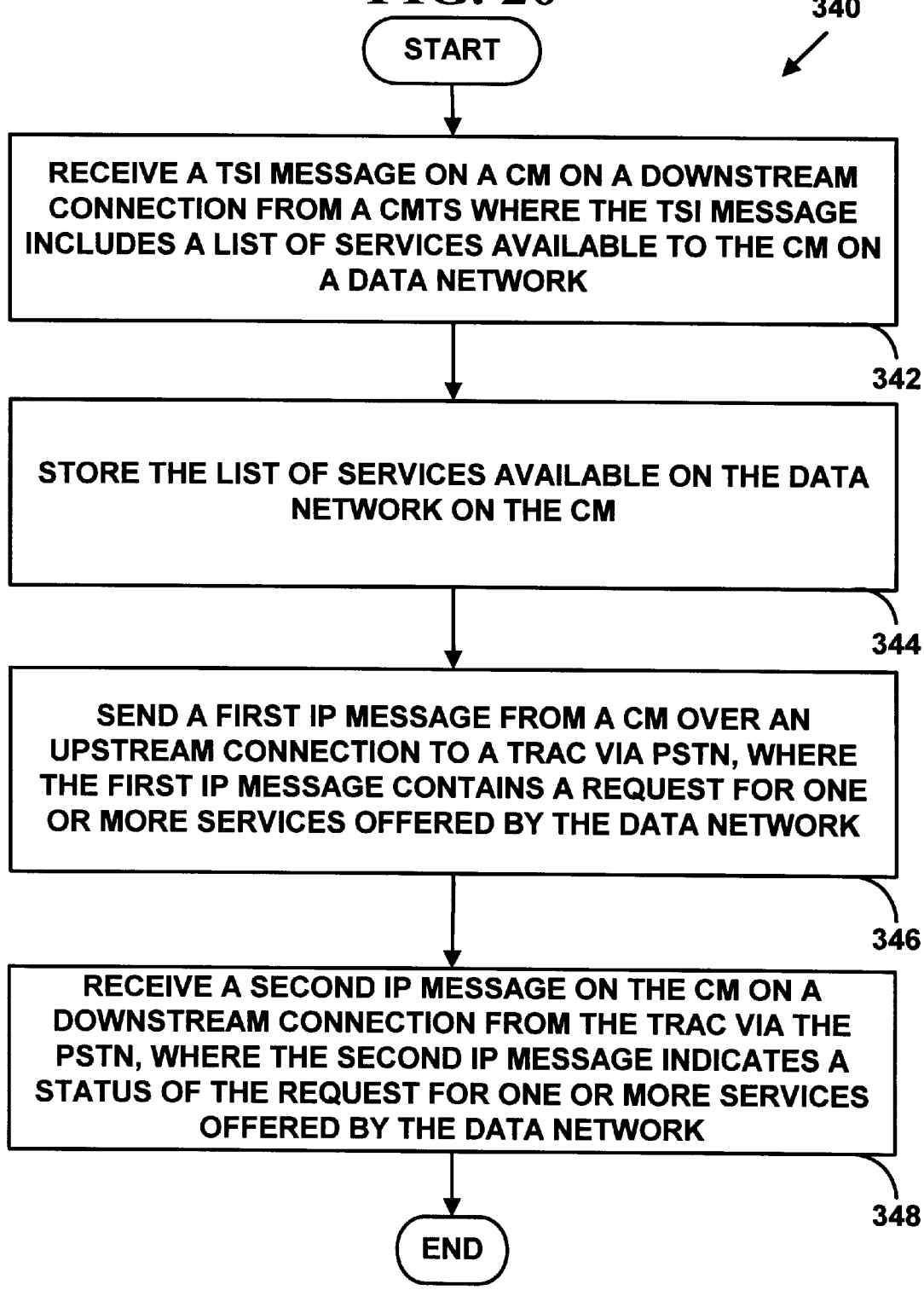

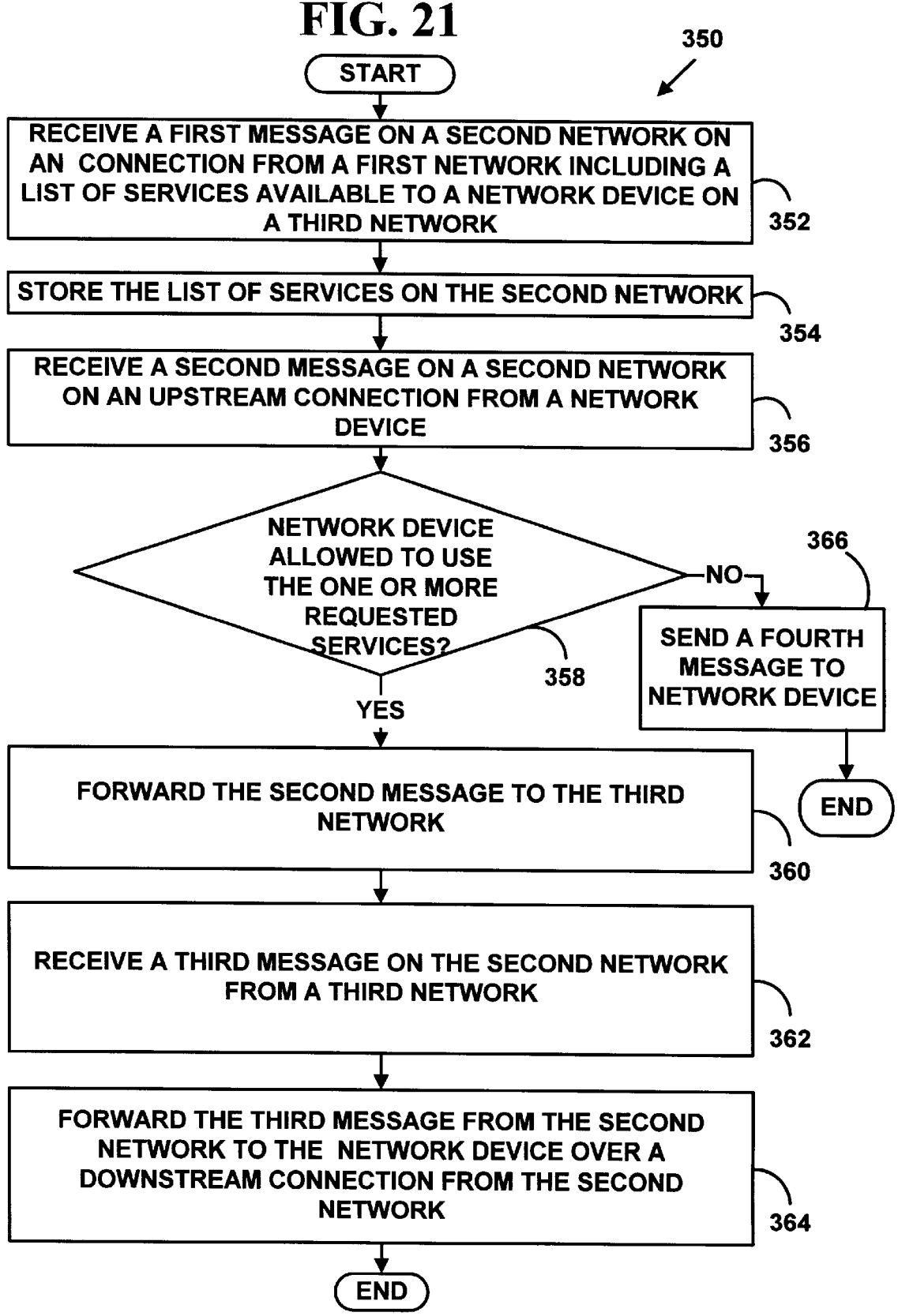

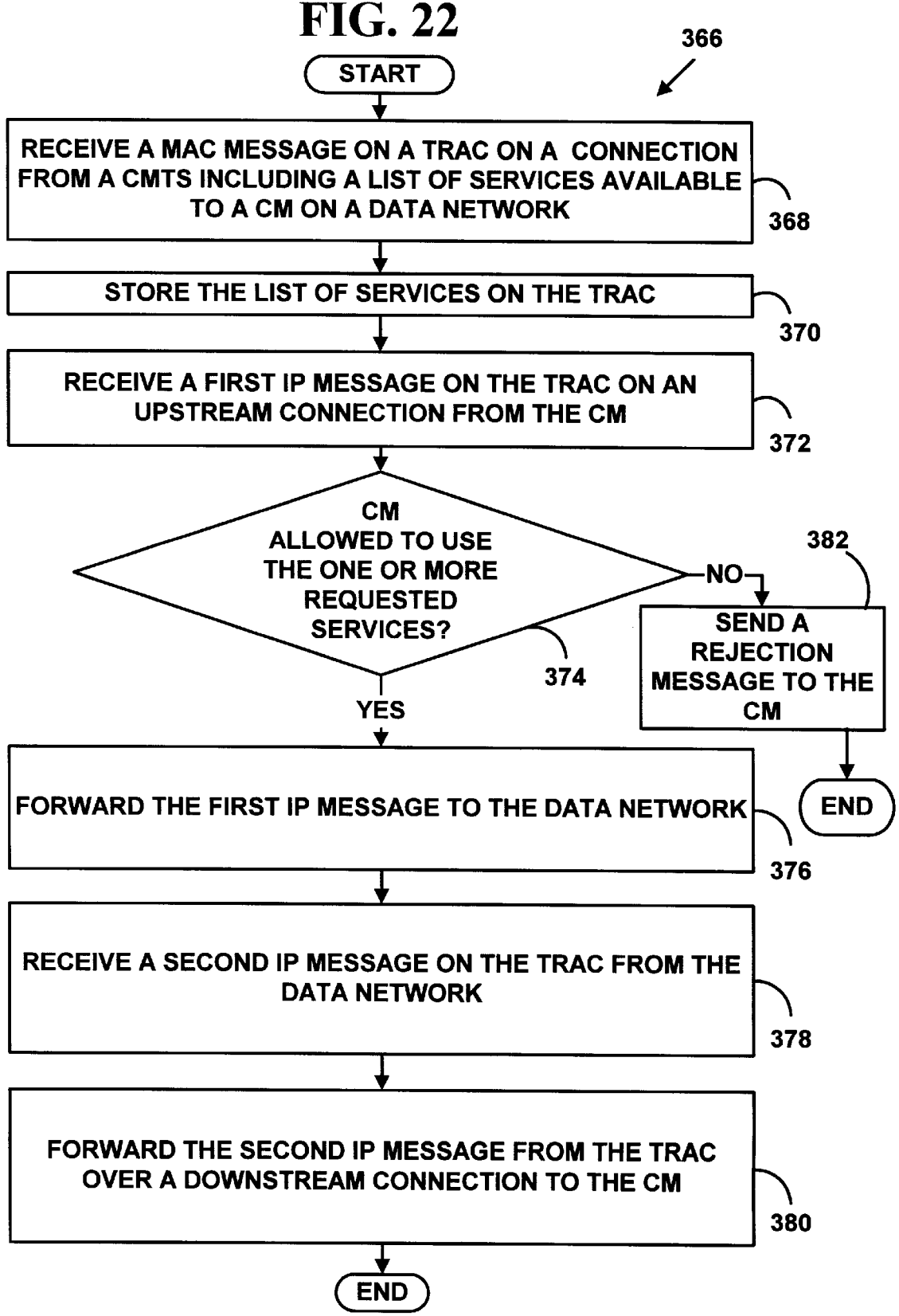

METHOD AND SYSTEM FOR MANAGING SUBSCRIPTION SERVICES WITH A CABLE MODEM

FIELD OF INVENTION

The present invention relates to communications in computer networks. More specifically, it relates to a method and system for managing subscription services with a cable modem with telephony return.

BACKGROUND OF THE INVENTION

Cable television networks such as those provided by Comcast Cable Communications, Inc., of Philadelphia, Pa., Cox Communications of Atlanta Ga., Tele-Communications, Inc., of Englewood Colo., Time-Warner Cable, of Marietta Ga., Continental Cablevision, Inc., of Boston Mass., and others provide cable television services to a large number of subscribers over a large geographical area. The cable television networks typically are interconnected by cables such as coaxial cables or a Hybrid Fiber/Coaxial ("HFC") cable system which have data rates of about 10 Mega-bits-per-second ("Mbps") to 30+ Mbps.

The Internet, a world-wide-network of interconnected computers, provides multimedia content including audio, video, graphics and text that requires a large bandwidth for downloading and viewing. Most Internet Service Providers ("ISPs") allow customers to connect to the Internet via a serial telephone line from a Public Switched Telephone Network ("PSTN") at data rates including 14,400 bps, 28,800 bps, 33,600 bps, 56,000 bps and others that are much slower than the about 10 Mbps to 30+ Mbps available on a coxial cable or HFC cable system on a cable television network.

With the explosive growth of the Internet, many customers have desired to use the larger bandwidth of a cable television network to connect to the Internet and other computer networks. Cable modems, such as those provided by 3Com Corporation of Santa Clara, Calif., U.S. Robotics Corporation of Skokie, Ill., and others offer customers higher-speed connectivity to the Internet, an intranet, Local Area Networks ("LANs") and other computer networks via cable television networks. These cable modems currently support a data connection to the Internet and other computer networks via a cable television network with a "downstream" data rate of 30+ Mbps, which is a much larger data rate than can be supported by serial telephone line used over a modem.

However, most cable television networks provide only uni-directional cable systems, supporting only a "downstream" data path. A downstream data path is the flow of data from a cable system "headend" to a customer. A cable system headend is a central location in the cable television network that is responsible for sending cable signals in the downstream direction. A return data path via a telephone network, such as a Public Switched Telephone Network provided by AT&T and others, (i.e., "telephony return") is typically used for an "upstream" data path. An upstream data path is the flow of data from the customer back to the cable system headend. A cable television system with an upstream connection to a telephony network is called a "data-over-cable system with telephony return."

An exemplary data-over-cable system with telephony return includes a cable modem termination system, a cable television network, a public switched telephone network, a telephony remote access concentrator, a cable modem, customer premise equipment (e.g., a customer computer) and a data network (e.g., the Internet). The cable modem termination system and the telephony remote access concentrator together are called a "telephony return termination system."

The cable modem termination system receives data packets from the data network and transmits them downstream via the cable television network to a cable modem attached to the customer premise equipment. The customer premise equipment sends responses data packets to the cable modem, which sends response data packets upstream via the public switched telephone network to the telephony remote access concentrator, which sends the response data packets back to the appropriate host on the data network. The data-over-cable system with telephony return provides transparent Internet Protocol ("IP") data traffic between customer premise equipment, a cable modem and the data network (e.g., the Internet or an intranet). As is known in the art, IP is a routing protocol designed to route traffic within a network or between networks.

When a cable modem used in the data-over-cable system with telephony return is initialized, it will make a connection to both the cable modem termination system via the cable network and to the telephony remote access concentrator via the public switched telephone network. If the cable modem is using telephony return, it will acquire telephony connection parameters on a downstream connection from the cable modem termination system and establish a Point-to-Point Protocol ("PPP") connection to connect an upstream channel to the telephony remote access concentrator. As is known in the art, PPP is used to encapsulate datagrams over a serial communications link. After a PPP connection is established, the cable modem negotiates a telephony IP address with the telephony remote access concentrator. The telephony IP address allows the customer premise equipment to send IP data packets upstream to the telephony remote access concentrator via the public switched telephone network to the data network. The cable modem also makes an IP connection to the cable modem termination system so that IP data received on the cable modem termination system from the data network can be forwarded downstream to the customer premise equipment via the cable network and the cable modem.

A cable modem in a data-over-cable system can be used to allow a user to subscribe to one or more services offered by a data network. For example, the cable modem can be used to subscribe a user to a particular Internet Service Provider ("ISP"), or connect to a specific Internet or intranet site, or access a desired Internet Service.

However, there are several problems with using a cable modem in a data-over-cable system to subscribe to services or connect to sites offered by a data network. Security of the cable television network or the cable modem termination system can be compromised by allowing a user with a cable modem to subscribe to one or more services on the data network without security checks. For example, a user may subscribe to a service on the data network that is undesirable or incompatible for use with the cable modem termination system or cable network. The service may use a protocol that is incompatible with the cable television network subscribe or provide content that may be undesirable based on policies established by the cable television network. The providers of the cable television network may also desire to limit cable modem users to specific services and not allow cable modem users to subscribe to all available services on a data network unless additional fees are paid. In addition, the higher bandwidth downstream cable television connections are used for administrative tasks when a lower bandwidth telephony connection via a public switched telephone network is available in the data over-cable system with telephony return. It is desirable to use the telephony return path to allow a cable modem to subscribe to services on a data network outside of cable television connections.

SUMMARY OF THE INVENTION

In accordance with an illustrative embodiment of the present invention, the problems associated with using a cable modem in a data-over-cable system to subscribe to services offered by a data network are overcome. A method and system is provided for management of services for a data network from a network device. The method includes a data-over-cable system with a network device connected to a first network with a downstream connection of a first connection type, connected to a second network with an upstream connection of a second connection type and connected to the second network with a second downstream connection of the second connection type. The first and second networks are connected to a third network with a third connection type. In an illustrative embodiment of the present invention, the network device is a cable modem, the first network is a cable television network, the second network is a public switched telephone network and the third network is a data network (e.g., the Internet or an intranet). The first connection type is a cable television connection, the second connection type is a telephony connection and the third connection type is an Internet Protocol connection. However, other network devices, networks and connection types can also be used and the present invention is not limited to these network devices, networks or connections.

The method includes receiving a first message from the first network on the first downstream connection on the network device, wherein the first message includes a list of services on the third network available to the network device. The list of services from the first message is stored on the network device.

A second message is sent from the network device on the upstream connection to the second network, wherein the second message includes a request for one or more of the network services available on the third network. A third message is received on the second downstream connection from the second network on the network device. The third message indicates a status for of the one or more available network services requested by the network device in the second message.

The method allows a cable modem to subscribe to one or more network services available on the data network without comprising the security of the cable television network or the cable modem termination system. A telephony remote access concentrator also uses the list of services available to the cable modem on the data network to provide an additional security mechanism. The telephony remote access concentrator receives the list of services in a management message from a cable modem termination system. The first and management messages contain a pre-determined list of services available on the data network such as a list of Internet or intranet sites available to the cable modem. In an illustrative embodiment of the present invention, the predetermined list is small set of Internet or intranet sites on the data network the cable modem is allowed to connect to.

Thus, the cable modem has access only to the small set of Internet or intranet sites on the data network provided in the first message and does not have access to all sites and service available on the data network. The telephony remote access concentrator checks the list of services each time a cable modem requests a service on the data network. If the cable modem requests a service that is not in the list of services maintained by the telephony remote access concentrator, the request for services by the cable modem is rejected. In another embodiment of the present invention, the small set of Internet or intranet sites are preferred sites only and the cable modem has access to all sites and services available on the data network and the telephony remote access concentrator will not reject requests from the cable modem.

An illustrative embodiment of the present invention allows a cable modem to request one or more services available on a data network such as the Internet or an intranet by using a telephony return pathway in the data-over-cable system. Using the telephony return path improves the security of the cable television system. In addition, the telephony return path is used to provide administrative support on lower bandwidth connections for a data-over-cable system by providing an administrative pathway outside of the higher bandwidth cable television connections.

The foregoing and other features and advantages of an illustrative embodiment of the present invention will be more readily apparent from the following detailed description, which proceeds with references to the accompanying drawings.

BRIEF DESCRIPTION OF THE DRAWINGS

FIGS. 7A and 7B are a flow diagram illustrating a method for discovering hosts in a cable modem system;

FIGS. 14A and 14B are a flow diagram illustrating a method for resolving addresses for customer premise equipment;

FIGS. 15A and 15B are a flow diagram illustrating a method for addressing network host interfaces from customer premise equipment;

FIGS. 16A and 16B are a flow diagram illustrating a method for resolving network host interfaces from customer premise equipment;

FIG. 17 is a block diagram illustrating a message flow for the methods in FIGS. 15A, 15B, and 16A and 16B;

FIG. 19 is a flow diagram illustrating a method for managing network services from a network device; and FIG. 20 is a flow diagram illustrating a method for managing network services from a cable modem;

FIG. 21 is a flow diagram illustrating a method for managing network services from a network; and FIG. 22 is a flow diagram illustrating a method for managing network services from a telephony remote termination system.

DETAILED DESCRIPTION OF AN ILLUSTRATIVE EMBODIMENT

Cable modem system with telephony return

Figure 1:
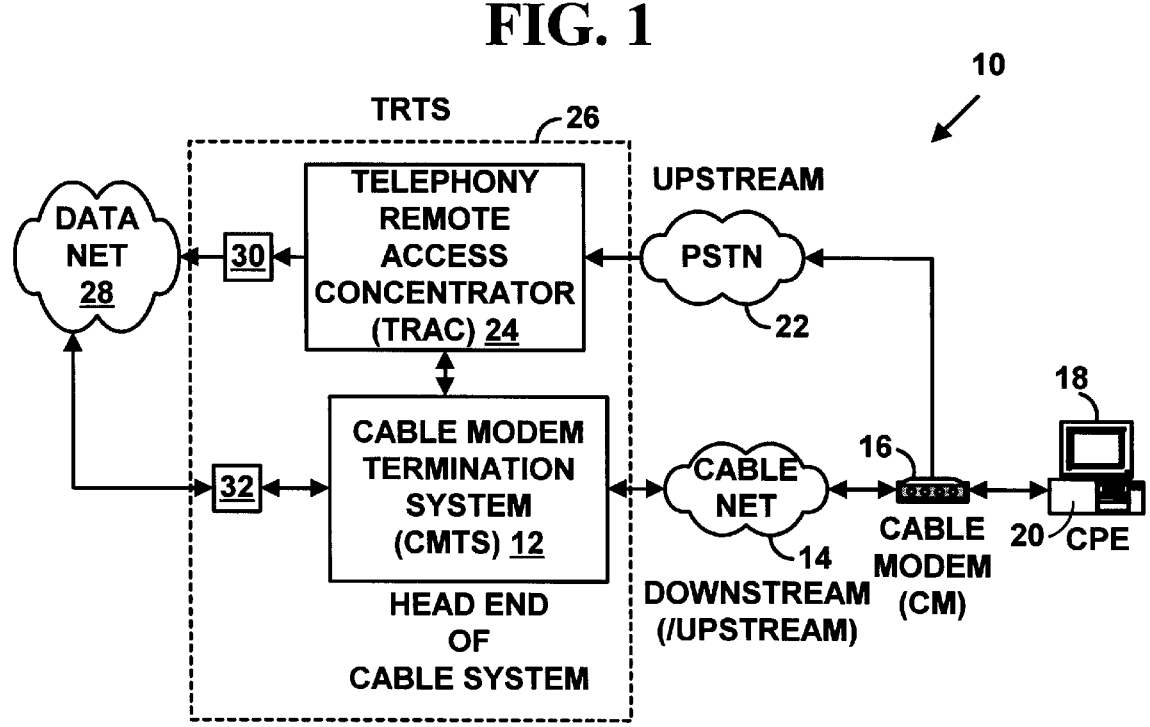
FIG. 1 is a block diagram illustrating a cable modem system with telephony return.

FIG. 1 is a block diagram illustrating a data-over-cable system with telephony return 10, hereinafter data-over-cable system 10. Most cable providers known in the art predominately provide uni-directional cable systems, supporting only a "downstream" data path. A downstream data path is the flow of data from a cable television network "headend" to customer premise equipment (e.g., a customer's personal computer). A cable television network headend is a central location that is responsible for sending cable signals in a downstream direction. A return path via a telephony network ("telephony return") is typically used for an "upstream" data path in uni-directional cable systems. An upstream data path is the flow of data from customer premise equipment back to the cable television network headend.

However, data-over-cable system 10 of the present invention may also provide a bi-directional data path (i.e., both downstream and upstream) without telephony return as is also illustrated in FIG. 1 and the present invention is not limited to a data-over-cable system with telephony return. In a data-over cable system without telephony return, customer premise equipment or cable modem has an upstream connection to the cable modem termination system via a cable television connection, a wireless connection, a satellite connection, or a connection via other technologies to send data upstream to the cable modem termination system.

Data-over-cable system 10 includes a Cable Modem Termination System ("CMTS") 12 connected to a cable television network 14, hereinafter cable network 14. Cable network 14 includes cable television networks such as those provided by Comcast Cable Communications, Inc., of Philadelphia, Pa., Cox Communications, or Atlanta, Ga., Tele-Communications, Inc., of Englewood Colo., Time-Warner Cable, of Marietta, Ga., Continental Cablevision, Inc., of Boston, Mass., and others. Cable network 14 is connected to a Cable Modem ("CM") 16 with a downstream cable connection.

CM 16 is connected to Customer Premise Equipment ("CPE") 18 such as a personal computer system via a Cable Modem-to-CPE Interface ("CMCI") 20. CM 16 is connected to a Public Switched Telephone Network ("PSTN") 22 with an upstream telephony connection. PSTN 22 includes those public switched telephone networks provided by AT&T, Regional Bell Operating Companies (e.g., Ameritch, U.S. West, Bell Atlantic, Southern Bell Communications, Bell South, NYNEX, and Pacific Telesis Group), GTE, and others. The upstream telephony connection is any of a standard telephone line connection, Integrated Services Digital Network ("ISDN") connection, Asymmetric Digital Subscriber Line ("ADSL") connection, or other telephony connection. PSTN 22 is connected to a Telephony Remote Access Concentrator ("TRAC") 24. In a data-over cable system without telephony return, CM 16 has an upstream connection to CMTS 12 via a cable television connection, a wireless connection, a satellite connection, or a connection via other technologies to send data upstream outside of the telephony return path. An upstream cable television connection via cable network 14 is illustrated in FIG. 1.

FIG. 1 illustrates a telephony modem integral to CM 16. In another embodiment of the present invention, the telephony modem is a separate modem unit external to CM 16 used specifically for connecting with PSTN 22. A separate telephony modem includes a connection to CM 16 for exchanging data. CM 16 includes cable modems provided by the 3Com Corporation of Santa Clara, Calif., U.S. Robotics Corporation of Skokie, Ill., and others. In yet another embodiment of the present invention, CM 16 includes functionality to connect only to cable network 14 and receives downstream signals from cable network 14 and sends upstream signals to cable network 14 without telephony return. The present invention is not limited to cable modems used with telephony return.

CMTS 12 and TRAC 24 may be at a "headend" of cable system 10, or TRAC 24 may be located elsewhere and have routing associations to CMTS 12. CMTS 12 and TRAC 24 together are called a "Telephony Return Termination System" ("TRTS") 26. TRTS 26 is illustrated by a dashed box in FIG. 1. CMTS 12 and TRAC 24 make up TRTS 26 whether or not they are located at the headend of cable network 14, and TRAC 24 may in located in a different geographic location from CMTS 12. Content severs, operations servers, administrative servers and maintenance servers used in data-over-cable system 10 (not shown in FIG. 1) may also be in different locations. Access points to data-over-cable system 10 are connected to one or more CMTS's 12 or cable headend access points. Such configurations may be "one-to-one", "one-to-many," or "many-to-many," and may be interconnected to other Local Area Networks ("LANs") or Wide Area Networks ("WANs").

TRAC 24 is connected to a data network 28 (e.g., the Internet or an intranet) by a TRAC-Network System Interface 30 ("TRAC-NSI"). CMTS 12 is connected to data network 28 by a CMTS-Network System Interface ("CMTS-NSI") 32. The present invention is not limited to data-over-cable system 10 illustrated in FIG. 1, and more or fewer components, connections and interfaces could also be used.

Cable modem protocol stack

Figure 2:
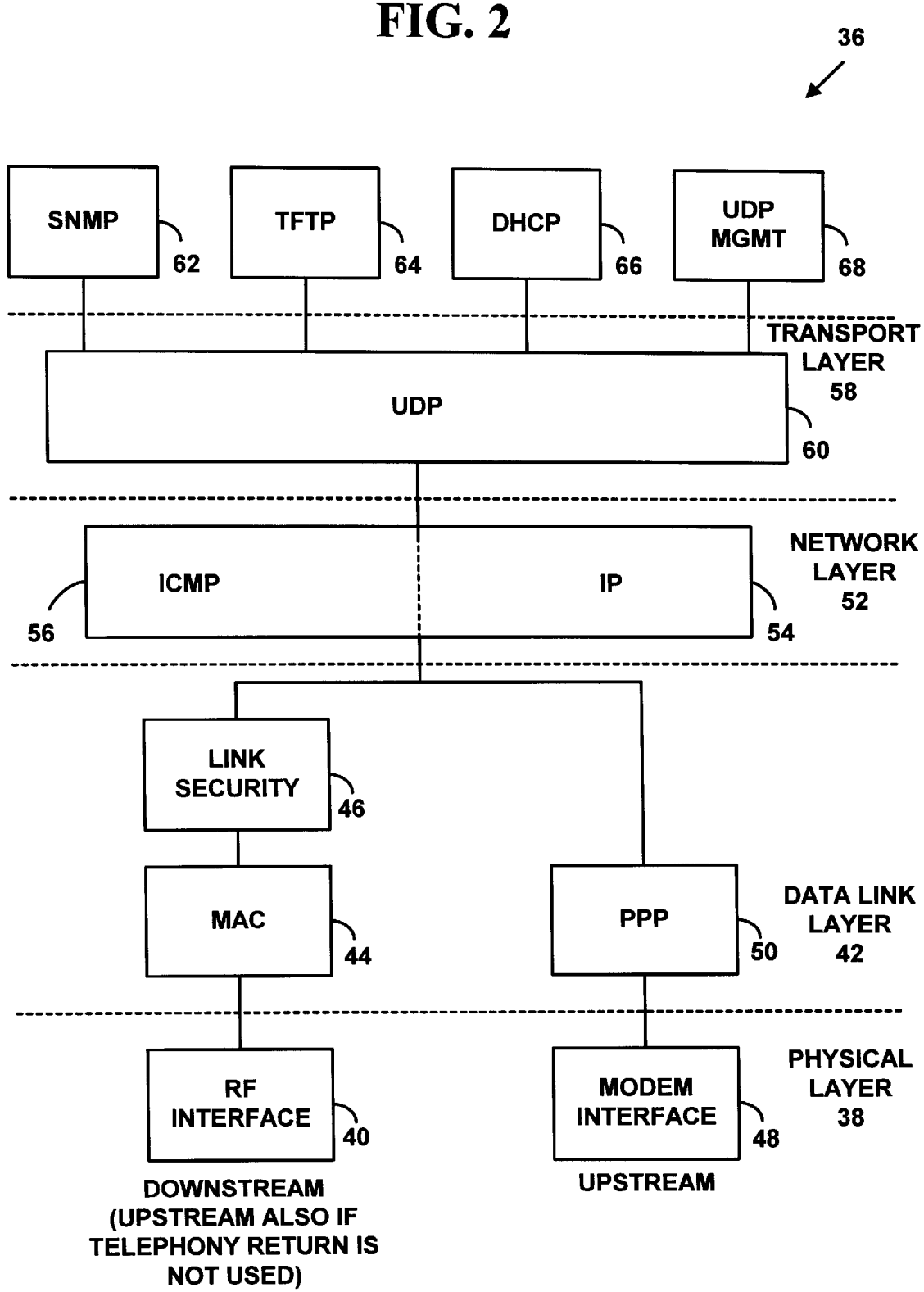
FIG. 2 is a block diagram illustrating a protocol stack for a cable modem.

FIG. 2 is a block diagram illustrating a protocol stack 36 for CM 16. FIG. 2 illustrates the downstream and upstream protocols used in CM 16. As is known in the art, the Open System Interconnection ("OSI") model is used to describe computer networks. The OSI model consists of seven layers including from lowest-to-highest, a physical, data-link, network, transport, session, application and presentation layer. The physical layer transmits bits over a communication link. The data link layer transmits error free frames of data. The network layer transmits and routes data packets.

For downstream data transmission, CM 16 is connected to cable network 14 in a physical layer 38 via a Radio Frequency ("RF") Interface 40. In an illustrative embodiment of the present invention, RF Interface 40 has an operation frequency range of 50 Mega-Hertz ("MHz") to 1 Giga-Hertz ("GHz") and a channel bandwidth of 6 MHz. However, other operation frequencies may also be used and the invention is not limited to these frequencies. RF interface 40 uses a signal modulation method of Quadrature Amplitude Modulation ("QAM"). As is known in the art, QAM is used as a means of encoding digital information over radio, wire, or fiber optic transmission links. QAM is a combination of amplitude and phase modulation and is an extension of multiphase phase-shift-keying. QAM can have any number of discrete digital levels typically including 4, 16, 64 or 256 levels. In one embodiment of the present invention, QAM-64 is used in RF interface 40. However, other operating frequencies modulation methods could also be used. For more information on RF interface 40 see the Institute of Electrical and Electronic Engineers ("IEEE") standard 802.14 for cable modems incorporated herein by reference. IEEE standards can be found on the World Wide Web at the Universal Resource Locator ("LURL") "www.ieee.org." However, other RF interfaces 40 could also be used and the present invention is not limited to IEEE 802.14 (e.g., RF interfaces from Multimedia Cable Network Systems ("MCNS") and other could also be used).

Above RF interface 40 in a data-link layer 42 is a Medium Access Control ("MAC") layer 44. As is known in the art, MAC layer 44 controls access to a transmission medium via physical layer 38. For more information on MAC layer protocol 44 see IEEE 802.14 for cable modems. However, other MAC layer protocols 44 could also be used and the present invention is not limited to IEEE 802.14 MAC layer protocols (e.g., MCNS MAC layer protocols and others could also be used).

Above MAC layer 44 is an optional link security protocol stack 46. Link security protocol stack 46 prevents authorized users from making a data connection from cable network 14. RF interface 40 and MAC layer 44 can also be used for an upstream connection if data-over-cable system 10 is used without telephony return.

For upstream data transmission with telephony return, CM 16 is connected to PSTN 22 in physical layer 38 via modem interface 48. The International Telecommunications Union-Telecommunication Standardization Sector ("ITU-T", formerly known as the CCITT) defines standards for communication devices identified by "V.xx" series where "xx" is an identifying number. ITU-T standards can be found on the World Wide Web at the URL "www.itu.ch."

In one embodiment of the present invention, ITU-T V.34 is used as modem interface 48. As is known in the art, ITU-T V.34 is commonly used in the data link layer for modem communications and currently allows data rates as high as 33,600 bits-per-second ("bps"). For more information see the ITU-T V.34 standard. However, other modem interfaces or other telephony interfaces could also be used.

Above modem interface 48 in data link layer 42 is Point-to-Point Protocol ("PPP") layer 50, hereinafter PPP 50. As is known in the art, PPP is used to encapsulate network layer datagrams over a serial communications link. For more information on PPP see Internet Engineering Task Force ("IETF") Request for Comments ("RFC"), RFC-1661, RFC-1662 and RFC-1663 incorporated herein by reference. Information for IETF RFCs can be found on the World Wide Web at URLs "ds.internic.net" or "www.ietf.org."

Above both the downstream and upstream protocol layers in a network layer 52 is an Internet Protocol ("IP") layer 54. IP layer 54, hereinafter IP 54, roughly corresponds to OSI layer 3, the network layer, but is typically not defined as part of the OSI model. As is known in the art, IP 54 is a routing protocol designed to route traffic within a network or between networks. For more information on IP 54 see RFC-791 incorporated herein by reference.

Internet Control Message Protocol ("ICMP") layer 56 is used for network management. The main functions of ICMP layer 56, hereinafter ICMP 56, include error reporting, reachability testing (e.g., "pinging") congestion control, route-change notification, performance, subnet addressing and others. Since IP 54 is an unacknowledged protocol, datagrams may be discarded and ICMP 56 is used for error reporting. For more information on ICMP 56 see RFC-971 incorporated herein by reference.

Above IP 54 and ICMP 56 is a transport layer 58 with User Datagram Protocol layer 60 ("UDP"). UDP layer 60, hereinafter UDP 60, roughly corresponds to OSI layer 4, the transport layer, but is typically not defined as part of the OSI model. As is known in the art, UDP 60 provides a connectionless mode of communications with datagrams. For more information on UDP 60 see RFC-768 incorporated herein by reference.

Above the network layer are a Simple Network Management Protocol ("SNMP") layer 62, Trivial File Protocol ("TFTP") layer 64, Dynamic Host Configuration Protocol ("DHCP") layer 66 and a UDP manager 68. SNMP layer 62 is used to support network management functions. For more information on SNMP layer 62 see RFC-1157 incorporated herein by reference. TFTP layer 64 is a file transfer protocol used to download files and configuration information. For more information on TFTP layer 64 see RFC-1350 incorporated herein by reference. DHCP layer 66 is a protocol for passing configuration information to hosts on an IP 54 network. For more information on DHCP layer 66 see RFC-1541 incorporated herein by reference. UDP manager 68 distinguishes and routes packets to an appropriate service (e.g., a virtual tunnel). More or few protocol layers could also be used with data-over-cable system 10.

CM 16 supports transmission and reception of IP 54 datagrams as specified by RFC-791. CMTS 12 and TRAC 24 may perform filtering of IP 54 datagrams. CM 16 is configurable for IP 54 datagram filtering to restrict CM 16 and CPE 18 to the use of only their assigned IP 54 addresses. CM 16 is configurable for IP 54 datagram UDP 60 port filtering (i.e., deep filtering).

CM 16 forwards IP 54 datagrams destined to an IP 54 unicast address across cable network 14 or PSTN 22. Some routers have security features intended to filter out invalid users who alter or masquerade packets as if sent from a valid user. Since routing policy is under the control of network operators, such filtering is a vendor specific implementation. For example, dedicated interfaces (i.e., Frame Relay) may exist between TRAC 24 and CMTS 12 which preclude filtering, or various forms of virtual tunneling and reverse virtual tunneling could be used to virtually source upstream packets from CM 16. For more information on virtual tunneling see Level 2 Tunneling Protocol ("L2TP") or Point-to-Point Tunneling Protocol ("PPTP") in IETF draft documents incorporated herein by reference by Kory Hamzeh, et. al (IETF draft documents are precursors to IETF RFCs and are works in progress).

CM 16 also forwards IP 54 datagrams destined to an IP 54 multicast address across cable network 14 or PSTN 22. CM 16 is configurable to keep IP 54 multicast routing tables and to use group membership protocols. CM 16 is also capable of IP 54 tunneling upstream through the telephony path. A CM 16 that wants to send a multicast packet across a virtual tunnel will prepend another IP 54 header, set the destination address in the new header to be the unicast address of CMTS 12 at the other end of the tunnel, and set the IP 54 protocol field to be four, which means the next protocol is IP 54.

CMTS 12 at the other end of the virtual tunnel receives the packet, strips off the encapsulating IP 54 header, and forwards the packet as appropriate. A broadcast IP 54 capability is dependent upon the configuration of the direct linkage, if any, between TRAC 24 and CMTS 12. CMTS 12, CM 16, and TRAC 24 are capable of routing IP 54 datagrams destined to an IP 54 broadcast address which is across cable network 14 or PSTN 22 if so configured. CM 16 is configurable for IP 54 broadcast datagram filtering.

An operating environment for CM 16 of the present invention includes a processing system with at least one high speed Central Processing Unit ("CPU") and a memory system. In accordance with the practices of persons skilled in the art of computer programming, the present invention is described below with reference to acts and symbolic representations of operations that are performed by the processing system, unless indicated otherwise. Such acts and operations are sometimes referred to as being "computer-executed", or "CPU executed."

It will be appreciated that the acts and symbolically represented operations include the manipulation of electrical signals by the CPU. The electrical system represent data bits which cause a resulting transformation or reduction of the electrical signal representation, and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or non-volatile mass storage system readable by the CPU. The computer readable medium includes cooperating or interconnected computer readable media, which exist exclusively on the processing system or is distributed among multiple interconnected processing systems that may be local or remote to the processing system.

Initialization of a cable modem with telephony return

When CM 16 is initially powered on, if telephony return is being used, CM 16 will receive a Telephony Channel Descriptor ("TCD") from CMTS 12 that is used to provide dialing and access instructions on downstream channels via cable network 14. Information in the TCD is used by CM 16 to connect to TRAC 24. The TCD is transmitted as a MAC management message with a management type value of TRI_TCD at a periodic interval (e.g., every 2 seconds). To provide for flexibility, the TCD message parameters are encoded in a Type/Length/Value ("TLV") form. However, other encoding techniques could also be used.

Figure 3:
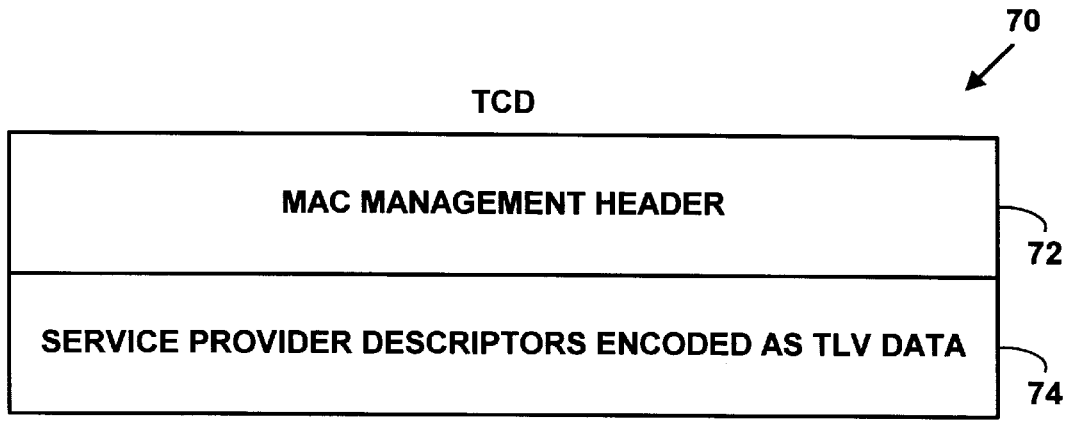
FIG. 3 is a block diagram illustrating a Telephony Channel Descriptor message structure.

FIG. 3 is a block diagram illustrating a TCD message structure 70 with MAC 44 management header 72 and Service Provider Descriptor(s) ("SPD") 74 encoded in TLV format. SPDs 74 are compound TLV encodings that define telephony physical-layer characteristics that are used by CM 16 to initiate a telephone call. SPD 74 is a TLV-encoded data structure that contains sets of dialing and access parameters for CM 16 with telephony return. SPD 74 is contained within TCD message 70. There may be multiple SPD 74 encodings within a single TCD message 70. There is at least one SPD 74 in TCD message 70. SPD 74 parameters are encoded as SPD-TLV tuples. SPD 74 contains the parameters shown in Table 1 and may contain optional vendor specific parameters. However, more or fewer parameters could also be used in SPD 74.

TABLE 1

| SPD 74 Parameter | Description |
| --- | --- |
| Factory Default Flag | Boolean value, if TRUE(1), indicates a SPD which should be used by CM 16. |

TABLE 1-continued

| SPD 74 Parameter | Description |
| --- | --- |
| Service Provider Name | This parameter includes the name of a service provider. Format is standard ASCII string composed of numbers and letters. |
| Telephone Numbers | These parameters contain telephone numbers that CM 16 uses to initiate a telephony modem link during a login process. Connections are attempted in ascending numeric order (i.e., Phone Number 1, Phone Number 2...). The SPD contains a vaild telephony dial string as the primary dial string (Phone Number 1), secondary dial-strings are optional. Format is ASCII string(s) composed of: any sequence of numbers, pound "#" and star "*" keys and comma character "," used to indicate a two second pause in dialing. |
| Connection Threshold | The number of sequential connection failures before indicating connection failure. A dial attempt that does not result in an answer and connection after no more than ten rings is considered a failure. The default value is one. |
| Login User Name | This contains a user name CM 16 will use an authentication protocol over the telephone link during the initialization procedure. Format is a monolithic sequence of alphanumeric characters in an ASCII string composed of numbers and letters. |
| Login Password | This contains a password that CM 16 will use during authentication over a telephone link during the initialization procedure. Format is a monolithic sequence of alphanumeric characters in an ASCII string composed of numbers and letters. |
| DHCP Authenticate | Boolean value, reserved to indicate that CM 16 uses a specific indicated DHCP 66 Server (see next parameter) for a DHCP 66 Client and BOOTP Relay Process when TRUE (one). The default is FALSE (zero) which allows any DHCP 66 Server. |
| DHCP Server | IP 54 address value of a DHCP 66 Server CM 16 uses for DHCP 66 Client and BOOTP Relay Process. If this attribute is present and DHCP 66 Authenticate attribute is TRUE(1). The default value is integer zero. |
| RADIUS Realm | The realm name is a string that defines a RADIUS server domain. Format is a monolithic sequence of alphanumeric characters in an ACSII string composed of numbers and letters. |
| PPP Authentication | This parameter instructs the telephone modem which authentication procedure to perform over the telephone link. |
| Demand Dial Timer | This parameter indicates time (in seconds) of inactive networking time that will be allowed to elapse before hanging up a telephone connection at CM 16. If this optional parameter is not present, or set to zero, then the demand dial feature is not activated. The default value is zero. |
| Vendor Specific Extensions | Optional vendor specific extensions. |

A Termination System Information ("TSI") message is transmitted by CMTS 12 at periodic intervals (e.g., every 2 seconds) to report CMTS 12 information to CM 16 whether or not telephony return is used. The TSI message is transmitted as a MAC 44 management message. The TSI provides a CMTS 12 boot record in a downstream channel to CM 16 via cable network 14. Information in the TSI is used by CM 16 to obtain information about the status of CMTS 12. The TSI message has a MAC 44 management type value of TRI_TSI.

Figure 4:
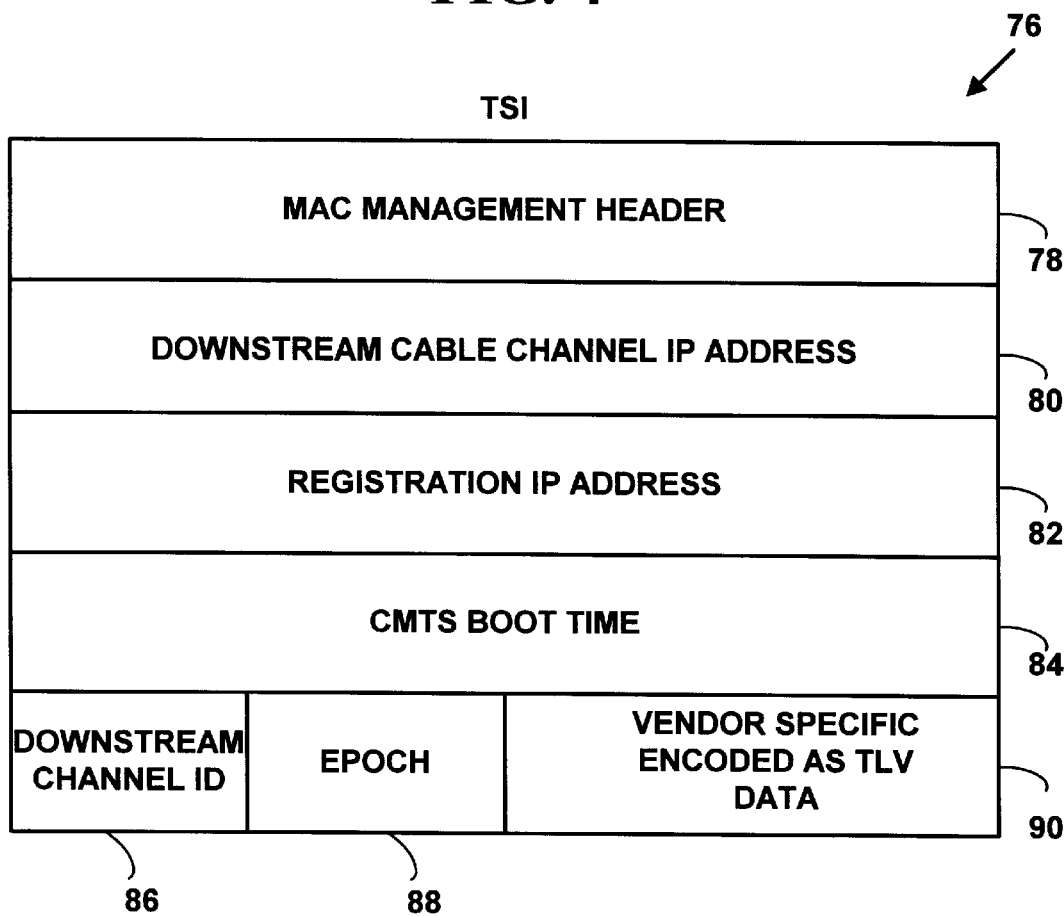
FIG. 4 is a block diagram illustrating a Termination System Information message structure.

FIG. 4 is a block diagram of a TSI message structure 76. TSI message structure 76 includes a MAC 44 management header 78, a downstream channel IP address 80, a registration IP address 82, a CMTS 12 boot time 84, a downstream channel identifier 86, an epoch time 88 and vendor specific TLV encoded data 90.

A description of the fields of TSI message 76 are shown in Table 2. However, more or fewer fields could also be used in TSI message 76.

TABLE 2

| TSI 76 Parameter | Description |
| --- | --- |
| Downstream Channel IP Address 80 | This field contains an IP 54 address of CMTS 12 available on the downstream channel this message arrived on. |
| Registration IP Address 82 | This field contains an IP 54 address CM 16 sends its registration request messages to. This address MAY be the same as the Downstream Channel IP 54 address. |
| CMTS Boot Time 84 | Specifies an absolute-time of a CMTS 12 recorded epoch. The clock setting for this epoch uses the current clock time with an unspecified accuracy. Time is represented as a 32 bit binary number. |
| Downstream Channel ID 86 | A downstream channel on which this message has been transmitted. This identifier is arbitrarily chosen by CMTS 12 and is unique within the MAC 44 layer. |
| Epoch 88 | An integer value that is incremented each time CMTS 12 is either re-initialized or performs address or routing table flush. |
| Vendor Specific Extensions 90 | Optional vendor extensions may be added as TLV encoded data. |

After receiving TCD 70 message and TSI message 76, CM 16 continues to establish access to data network 28 (and resources on the network) by first dialing into TRAC 24 and establishing a telephony PPP 50 session. Upon the completion of a successful PPP 50 connection, CM 16 performs PPP Link Control Protocol ("LCP") negotiation with TRAC 24. Once LCP negotiation is complete, CM 16 requests Internet Protocol Control Protocol ("IPCP") address negotiation. For more information on IPCP see RFC-1332 incorporated herein by reference. During IPCP negotiation, CM 16 negotiates an IP 54 address with TRAC 24 for sending IP 54 data packet responses back to data network 28 via TRAC 24.

When CM 16 has established an IP 54 link to TRAC 24, it begins "upstream" communications to CMTS 12 via DHCP layer 66 to complete a virtual data connection by attempting to discover network host interfaces available on CMTS 12 (e.g., IP 54 host interfaces for a virtual IP 54 connection). The virtual data connection allows CM 16 to receive data from data network 28 via CMTS 12 and cable network 14, and send return data to data network 28 via TRAC 24 and PSTN 22. CM 16 must first determine an address of a host interface (e.g., an IP 54 interface) available on CMTS 12 that can be used by data network 28 to send data to CM 16. However, CM 16 has only a downstream connection from CMTS 12 and has to obtain a connection address to data network 28 using an upstream connection to TRAC 24.

Figure 5:
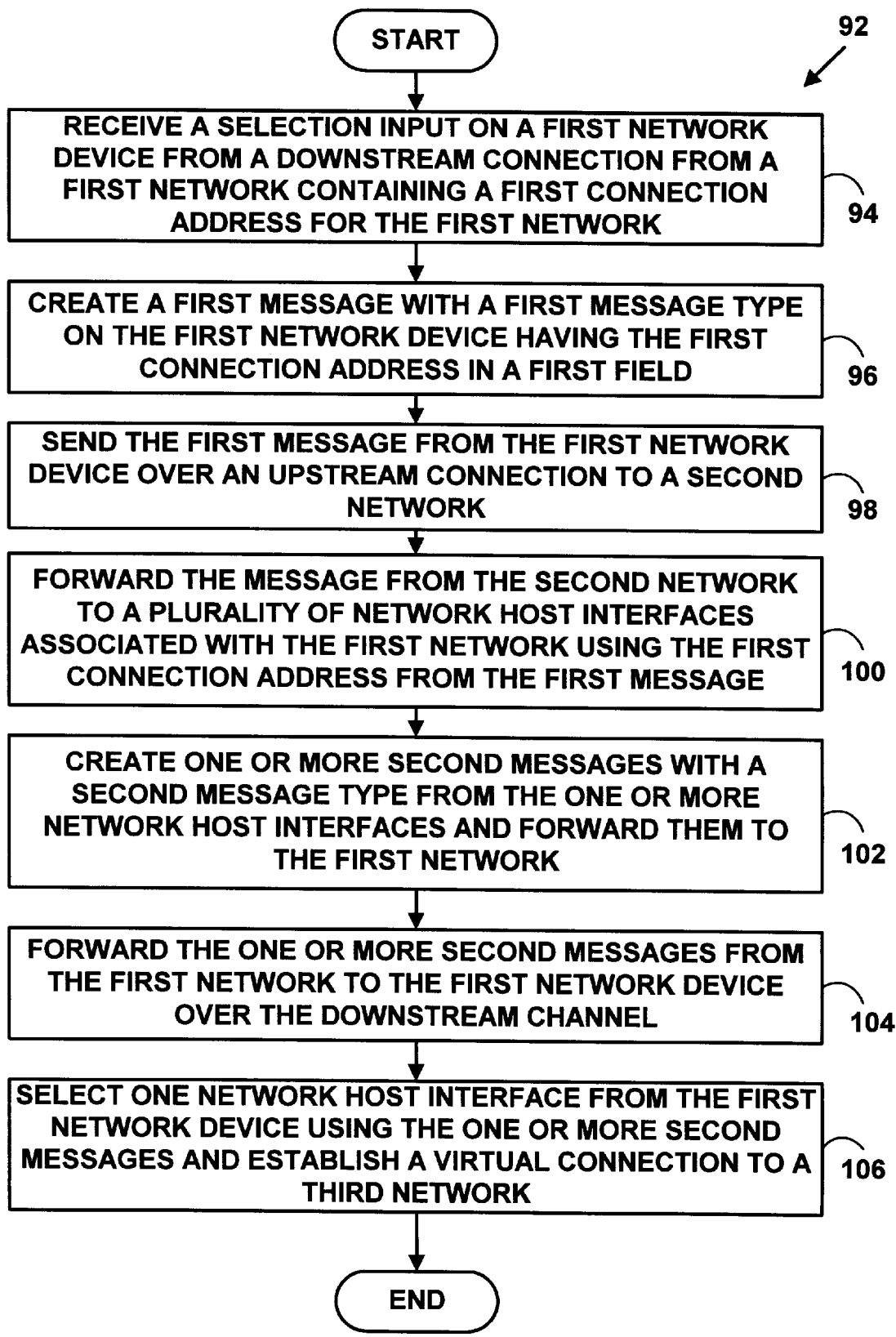
FIG. 5 is a flow diagram illustrating a method for addressing hosts in a cable modem system.

Addressing network host interfaces in the data-over-cable system via the cable modem FIG. 5 is a flow diagram illustrating a method 92 for addressing network host interfaces in a data-over-cable system with telephony return via a cable modem. Method 92 allows a cable modem to establish a virtual data connection to a data network. In method 92, multiple network devices are connected to a first network with a downstream connection of a first connection type, and connected to a second network with an upstream connection of a second connection type. The first and second networks are connected to a third network with a third connection type.

At step 94, a selection input is received on a first network device from the first network over the downstream connection. The selection input includes a first connection address allowing the first network device to communicate with the first network via upstream connection to the second network. At step 96, a first message of a first type for a first protocol is created on the first network device having the first connection address from the selection input in a first message field. The first message is used to request a network host interface address on the first network. The first connection address allows the first network device to have the first message with the first message type forwarded to network host interfaces available on the first network via the upstream connection to the second network.

At step 98, the first network device sends the first message over the upstream connection to the second network. The second network uses the first address field in the first message to forward the first message to one or more network host interfaces available on first network at step 100. Network host interfaces available on the first network that can provide the services requested in first message send a second message with a second message type with a second connection address in a second message field to the first network at step 102. The second connection address allows the first network device to receive data packets from the third network via a network host interface available on the first network. The first network forwards one or more second messages on the downstream connection to the first network device at step 104.

The first network device selects a second connection address from one of the second messages from one of the one or more network host interfaces available on the first network at step 106 and establishes a virtual connection from the third network to the first network device using the second connection address for the selected network host interface.

The virtual connection includes receiving data on the first network host interface on the first network from the third network and sending the data over the downstream connection to the first network device. The first network device sends data responses back to the third network over the upstream connection to the second network, which forwards the data to the appropriate destination on the third network.

In one embodiment of the present invention, the data-over-cable system is data-over-cable system 10, the first network device is CM 16, the first network is cable television network 14, the downstream connection is a cable television connection. The second network is PSTN 22, the upstream connection is a telephony connection, the third network is data network 28 (e.g., the Internet or an intranet) and the third type of connection is an IP 54 connection. The first and second connection addresses are IP 54 addresses. However, the present invention is not limited to the network components and addresses described. Method 92 allows CM 16 to determine an IP 54 network host interface address available on CMTS 12 to receive IP 54 data packets from data network 28, thereby establishing a virtual IP 54 connection with data network 28.

After addressing network host interfaces using method 92, an exemplary data path through cable system 10 is illustrated in Table 3. However other data paths could also be used and the present invention is not limited to the data paths shown in Table 3. For example, CM 16 may send data upstream back through cable network 14 (e.g., CM 16 to cable network 14 to CMTS 12) and not use PSTN 22 and the telephony return upstream path.

TABLE 3

1. An IP 54 datagram from data network 28 destined for CM 16 arrives on CMTS-NSI 32 and enters CMTS 12.
2. CMTS 12 encodes the IP 54 datagram in a cable data frame, passes it
   it to MAC 44 and transmits it "downstream" to RF interface 40 on CM 16 via cable network 14.
3. CM 16 recognizes the encoded IP 54 datagram in MAC layer 44 received via RF interface 40.
4. CM 16 responds to the cable data frame and encapsulates a response IP 54 datagram in a PPP 50 frame and transmits it "upstream" with modem interface 48 via PSTN 22 to TRAC 24.
5. TRAC 24 decodes the IP 54 datagram and forwards it via TRAC-NSI 30 to a destination on data network 28.

Dynamic network host configuration on data-over-cable system

As was illustrated in FIG. 2, CM 16 includes a Dynamic Host Configuration Protocol ("DHCP") layer 66, hereinafter DHCP 66. DHCP 66 is used to provide configuration parameters to hosts on a network (e.g., an IP 54 network). DHCP 66 consists of two components: a protocol for delivering host-specific configuration parameters from a DHCP 66 server to a host and a mechanism for allocation of network host addresses to hosts. DHCP 66 is built on a client-server model, where designated DHCP 66 servers allocate network host addresses and deliver configuration parameters to dynamically configured network host clients.

Figure 6:
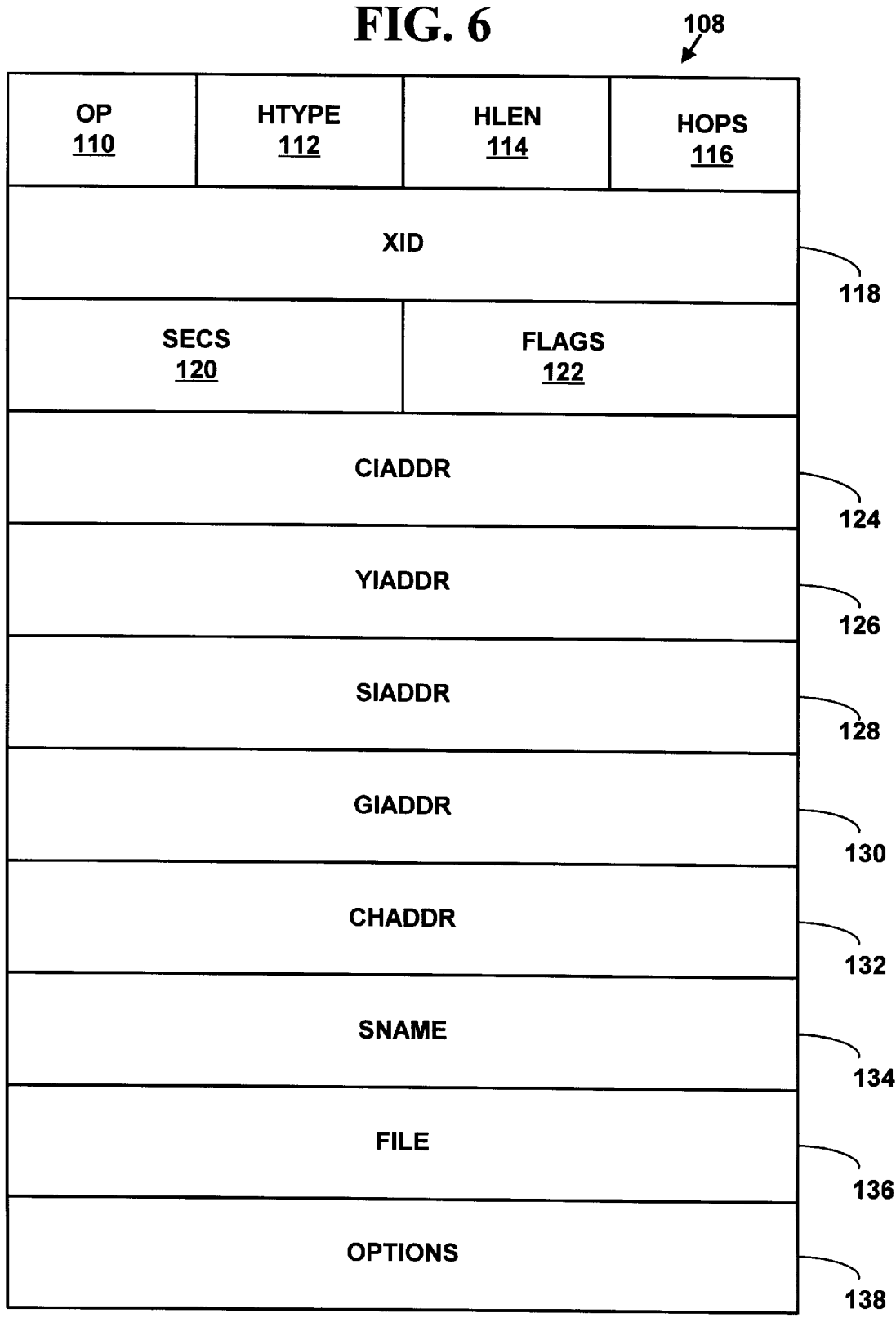
FIG. 6 is a block diagram illustrating a Dynamic Host Configuration Protocol message structure.

FIG. 6 is a block diagram illustrating a DHCP 66 message structure 108. The format of DHCP 66 messages is based on the format of BOOTstrap Protocol ("BOOTP") messages described in RFC-951 and RFC-1542 incorporated herein by reference. From a network host client's point of view, DHCP 66 is an extension of the BOOTP mechanism. This behavior allows existing BOOTP clients to interoperate with DHCP 66 servers without requiring any change to network host the clients' BOOTP initialization software. DHCP 66 provides persistent storage of network parameters for network host clients.

To capture BOOTP relay agent behavior described as part of the BOOTP specification and to allow interoperability of existing BOOTP clients with DHCP 66 servers, DHCP 66 uses a BOOTP message format. Using BOOTP relaying agents eliminates the necessity of having a DHCP 66 server on each physical network segment.

DHCP 66 message structure 108 includes an operation code field 110 ("op"), a hardware address type field 112 ("htype"), a hardware address length field 114 ("hlen"), a number of hops field 116 ("hops"), a transaction identifier field 118 ("xid"), a seconds elapsed time field 120 ("secs"), a flags field 122 ("flags"), a client IP address field 124 ("ciaddr"), a your IP address field 126 ("yiaddr"), a server IP address field 128 ("siaddr"), a gateway/relay agent IP address field 130 ("giaddr"), a client hardware address field 132 ("chaddr"), an optional server name field 134 ("sname"), a boot file name 136 ("file") and an optional parameters field 138 ("options"). Descriptions for DHCP 66 message 108 fields are shown in Table 4.

TABLE 4

| DCHP 66 Parameter | Description |
| --- | --- |
| OP 110 | Message op code/message type. 1 BOOTREQUEST, 2 = BOOTREPLY. |
| HTYPE 112 | Hardware address type (e.g., '1' = 10 Mps Ethernet). |
| HLEN 114 | Hardware address length (e.g. '6' for 10 Mbps Ethernet). |
| HOPS 116 | Client sets to zero, optionally used by relay-agents when booting via a relay-agent. |
| XID 118 | Transaction ID, a random number chosen by the client, used by the client and server to associate messages and responses between a client and a server. |
| SECS 120 | Filled in by client, seconds elapsed since client started trying to boot. |
| FLAGS 122 | Flags including a BROADCAST bit. |
| CIADDR 124 | Client IP address; filled in by client in DHCPREQUEST if verifying previously allocated configuration parameters. |
| YIADDR 126 | 'Your'(client) IP address. |
| SIADDR 128 | IP 54 address of next server to use in bootstrap; returned in DHCPOFFER, DHCPACK and DHCPNAK by server. |
| GIADDR 130 | Gateway relay agent IP 54 address, used in booting via a relay-agent. |
| CHADDR 132 | Client hardware address (e.g., MAC layer 44 address). |
| SNAME 134 | Optional server host name, null terminated string. |
| FILE 136 | Boot file name, terminated by a null string. |
| OPTIONS 138 | Optional parameters. |

The DHCP 66 message structure shown in FIG. 6 is used to discover IP 54 and other network host interfaces in data-over-cable system 10. A network host client (e.g., CM 16) uses DHCP 66 to acquire or verify an IP 54 address and network parameters whenever the network parameters may have changed. Table 5 illustrates a typical use of the DHCP 66 protocol to discover a network host interface from a network host client.

TABLE 5

1. A network host client broadcasts a DHCP 66 discover message on its local physical subnet. The DHCP 66 discover message may include options that suggest values for a network host interface address. BOOTP relay agents may pass the message on to DHCP 66 servers not on the same physical subnet.
2. DHCP servers may respond with a DHCPOFFER message that includes an available network address in the 'yiaddr' field (and other configuration parameters in DHCP 66 options) from a network host interface. DHCP 66 servers unicasts the DHCPOFFER message to the network host client (using the DHCP/BOOTP relay agent if necessary) if possible, or may broadcast the message to a broadcast address (preferably 255.255.255.255) on the client's subnet.
3. The network host client receives one or more DHCPOFFER messages from one or more DHCP 66 servers. The network host client may choose to wait for multiple responses.
4. The network host client chooses one DHCP 66 server with an associated network host interface from which to request configuration parameters, based on the configuration parameters offered in the DHCPOFFER messages.

Discovering network host interfaces in the data-over-cable system

The DHCP discovery process illustrated in table 5 will not work in data-over-cable system 10. CM 16 has only a downstream connection from CMTS 12, which includes DHCP 66 servers, associated with network host interfaces available on CMTS 12. In an illustrative embodiment of the present invention, CM 16 discovers network host interfaces via TRAC 24 and PSTN 22 on an upstream connection.

The DHCP 66 addressing process shown in Table 5 was not originally intended to discover network host interfaces in data-over-cable system 10. CMTS 12 has DHCP 66 servers associated with network host interfaces (e.g., IP interfaces), but CM 16 only has as downstream connection from CMTS 12. CM 16 has an upstream connection to TRAC 24, which has a DHCP 66 layer. However, TRAC 24 does not have DHCP 66 servers, or direct access to network host interfaces on CMTS 12.

Figure 7B:
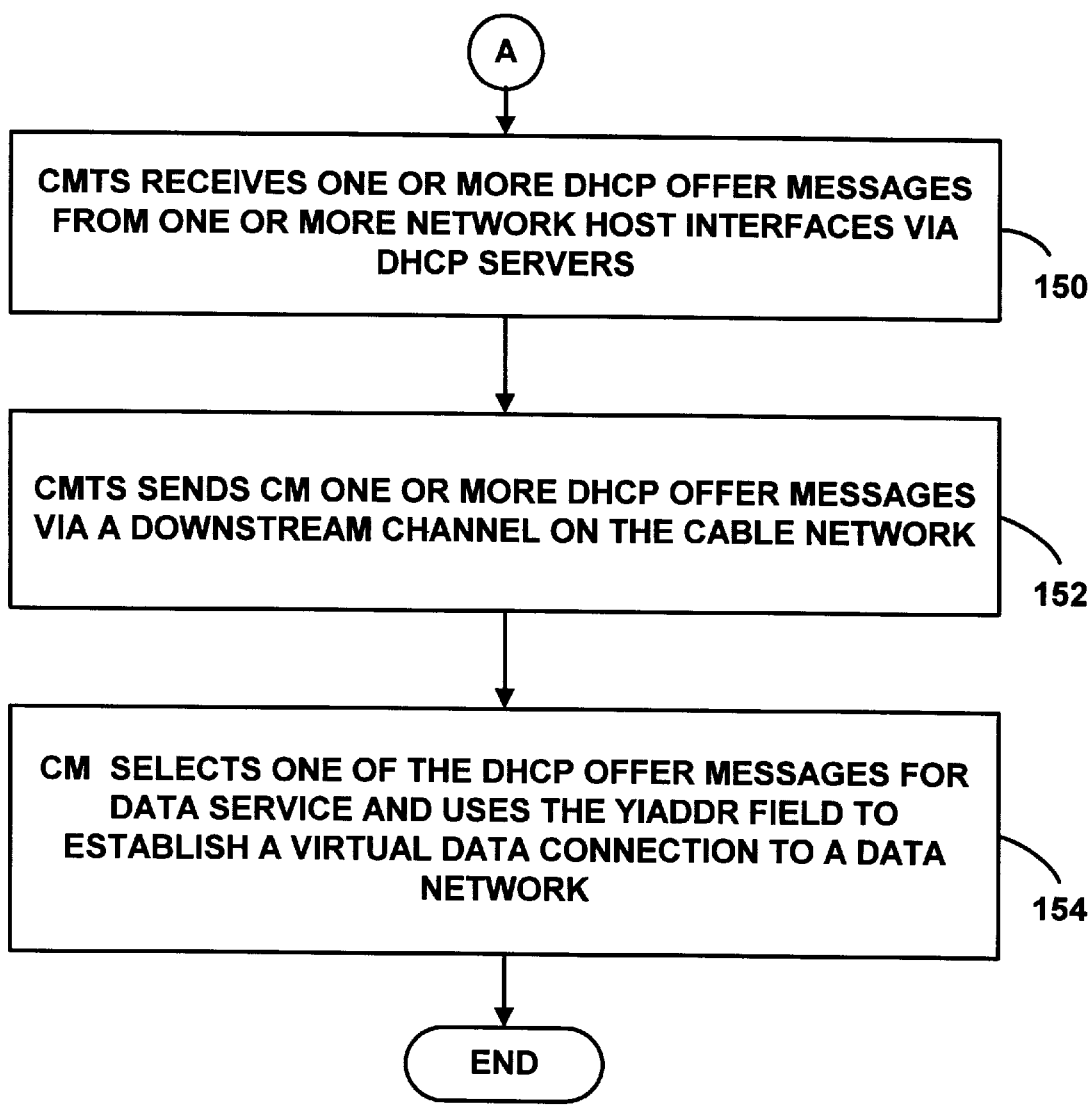

FIGS. 7A and 7B are a flow diagram illustrating a method 140 for discovering network host interfaces in data-over-cable system 10. When CM 16 has established an IP 54 link to TRAC 24, it begins communications with CMTS 12 via DHCP 66 to complete a virtual IP 54 connection with data network 28. However, to discover what IP 54 host interfaces might be available on CMTS 12, CM 16 has to communicate with CMTS 12 via PSTN 22 and TRAC 24 since CM 16 only has a "downstream" cable channel from CMTS 12.

At step 142 in FIG. 7A, after receiving a TSI message 76 from CMTS 12 on a downstream connection, CM 16 generates a DHCP discover ("DHCPDISCOVER") message and sends it upstream via PSTN 22 to TRAC 22 to discover what IP 54 interfaces are available on CMTS 12. The fields of the DHCP discover message are set as illustrated in Table 6. However, other field settings may also be used.

TABLE 6

| DHCP 66 Parameter | Description |
| --- | --- |
| OP 110 | Set to BOOTREQUEST. |
| HTYPE 112 | Set to network type (e.g., one for 10 Mbps Ethernet). |
| HLEN 114 | Set to network length (e.g., six for 10 Mbps Ethernet) |
| HOPS 116 | Set to zero. |
| FLAGS 118 | Set BROADCAST bit to zero. |
| CIADDR 124 | If CM 16 has previously been assigned an IP 54 address, the IP 54 address is placed in this field. If CM 16 has previously been assigned an IP 54 address by DHCP 66, and also has been assigned an address via IPCP, CM 16 places the DHCP 66 IP 54 address in this field. |
| GIADDR 130 | CM 16 places the Downstream Channel IP 54 address 80 of CMTS 12 obtained in TSI message 76 on a cable downstream channel in this field. |
| CHADDR 132 | CM 16 places its 48-bit MAC 44 LAN address in this field. |

The DHCPDISCOVER message is used to "discover" the existence of one or more IP 54 host interfaces available on CMTS 12. DHCP 66 giaddr-field 130 (FIG. 6) includes the downstream channel IP address 80 of CMTS 12 obtained in TSI message 76 (e.g., the first message field from step 96 of method 92). Using the downstream channel IP address 80 of CMTS 12 obtained in TSI message 76 allows the DHCPDISCOVER message to be forwarded by TRAC 24 to DHCP 66 servers (i.e., protocol servers) associated with network host interfaces available on CMTS 12. If DHCP 66 giaddr-field 130 (FIG. 6) in a DHCP message from a DHCP 66 client is non-zero, the DHCP 66 server sends any return messages to a DHCP 66 server port on a DHCP 66 relaying agent (e.g., CMTS 12) whose address appears in DHCP 66 giaddr-field 130.

In a typical DHCP 66 discovery process the DHCP 66 giaddr-field 130 is set to zero. If DHCP 66 giaddr-field 130 is zero, the DHCP 66 client is on the same subnet as the DHCP 66 server, and the DHCP 66 server sends any return messages to either the DHCP 66 client's network address, if that address was supplied in DHCP 66 ciaddr-field 124 (FIG. 6), or to a client's hardware address specified in DHCP 66 chaddr-field 132 (FIG. 6) or to a local subnet broadcast address (e.g., 255.255.255.255).

At step 144, a DHCP 66 layer on TRAC 24 broadcasts the DHCPDISCOVER message on its local network leaving DHCP 66 giaddr-field 130 intact since it already contains a non-zero value. TRAC's 24 local network includes connections to one or more DHCP 66 proxies (i.e., network host interface proxies). The DHCP 66 proxies accept DHCP 66 messages originally from CM 16 destined for DHCP 66 servers connected to network host interfaces available on CMTS 12 since TRAC 24 has no direct access to DCHP 66 servers associated with network host interfaces available on CMTS 12. DHCP 66 proxies are not used in a typical DHCP 66 discovery process.

One or more DHCP 66 proxies on TRAC's 24 local network recognizes the DHCPDISCOVER message and forwards it to one or more DHCP 66 servers associated with network host interfaces (e.g., IP 54 interfaces) available on CMTS 12 at step 146. Since DHCP 66 giaddr-field 130 (FIG. 6) in the DHCPDISCOVER message sent by CM 16 is already non-zero (i.e., contains the downstream IP address of CMTS 12), the DHCP 66 proxies also leave DHCP 66 giaddr-field 130 intact.

One or more DHCP 66 servers for network host interfaces (e.g., IP 54 interfaces) available on CMTS 12 receive the DHCPDISCOVER message and generate a DHCP 66 offer message ("DHCPOFFER") at step 148. The DHCP 66 offer message is an offer of configuration parameters sent from network host interfaces to DHCP 66 servers and back to a network host client (e.g., CM 16) in response to a DHCP-DISCOVER message. The DHCP 66 offer message is sent with the message fields set as illustrated in Table 7. However, other field settings can also be used. DHCP 66 yiaddr-field 126 (e.g., second message field from step 102 of method 92) contains an IP 54 address for a network host interface available on CMTS 12 and used for receiving data packets from data network 28.

TABLE 7

| DHCP 66 Parameter | Description |
| --- | --- |
| FLAGS 122 | BROADCAST bit set to zero. |
| YIADDR 126 | IP 54 address from a network host interface to allow CM 16 to receive data from data network 28 via a network host interface available on CMTS 12. |
| SIADDR 128 | An IP 54 address for a TFTP 64 server to download configuration information for an interface host. |
| CHADDR 132 | MAC 44 address of CM 16. |
| SNAME 134 | Optional DHCP 66 server identifier with an interface host. |
| FILE 136 | A TFTP 64 configuration file name for CM 16. |

DHCP 66 servers send the DHCPOFFER message to the address specified in 66 giaddr-field 130 (i.e., CMTS 12) from the DHCPDISCOVER message if associated network host interfaces (e.g., IP 54 interfaces) can offer the requested service (e.g., IP 54 service) to CM 16. The DHCPDISOVER message DHCP 66 giaddr-field 130 contains a downstream channel IP address 80 of CMTS 12 that was received by CM 16 in TSI message 76. This allows CMTS 12 to receive the DHCPOFFER messages from the DHCP 66 servers and send them to CM 16 via a downstream channel on cable network 14.

At step 150 in FIG. 7B, CMTS 12 receives one or more DHCPOFFER messages from one or more DHCP 66 servers associated with the network host interfaces (e.g., IP 54 interfaces). CMTS 12 examines DHCP 66 yiaddr-field 126 and DHCP 66 chaddr-field 132 in the DHCPOFFER messages and sends the DHCPOFFER messages to CM 16 via cable network 14. DHCP 66 yiaddr-field 126 contains an IP 54 address for a network host IP 54 interface available on CMTS 12 and used for receiving IP 54 data packets from data network 28. DHCP 66 chaddr-field 132 contains the MAC 44 layer address for CM 16 on a downstream cable channel from CMTS 12 via cable network 14. CMTS 12 knows the location of CM 16 since it sent CM 16 a MAC 44 layer address in one or more initialization messages (e.g., TSI message 76).

If a BROADCAST bit in flags field 124 is set to one, CMTS 12 sends the DHCPOFFER messages to a broadcast IP 54 address (e.g., 255.255.255.255) instead of the address specified in DHCP 66 yiaddr-field 126. DHCP 66 chaddr-field 132 is still used to determine that MAC 44 layer address. If the BROADCAST bit in DHCP 66 flags field 122 is set, CMTS 12 does not update internal address or routing tables based upon DHCP 66 yiaddr-field 126 and DHCP 66 chaddr-field 132 pair when a broadcast message is sent.

At step 152, CM 16 receives one or more DHCPOFFER messages from CMTS 12 via cable network 14 on a downstream connection. At step 154, CM 16 selects an offer for IP 54 service from one of the network host interfaces (e.g., an IP interfaces 54) available on CMTS 12 that responded to the DHCPDISOVER message sent at step 142 in FIG. 7A and establishes a virtual IP 54 connection. The selected DHCPOFFER message contains a network host interface address (e.g., IP 54 address) in DHCP 66 yiaddr-field 126 (FIG. 6). A cable modem acknowledges the selected network host interface with DHCP 66 message sequence explained below.

After selecting and acknowledging a network host interface, CM 16 has discovered an IP 54 interface address available on CMTS 12 for completing a virtual IP 54 connection with data network 28. Acknowledging a network host interface is explained below. The virtual IP 54 connection allows IP 54 data from data network 28 to be sent to CMTS 12 which forwards the IP 54 packets to CM 16 on a downstream channel via cable network 14. CM 16 sends response IP 54 packets back to data network 28 via PSTN 22 and TRAC 24.

Figure 8:
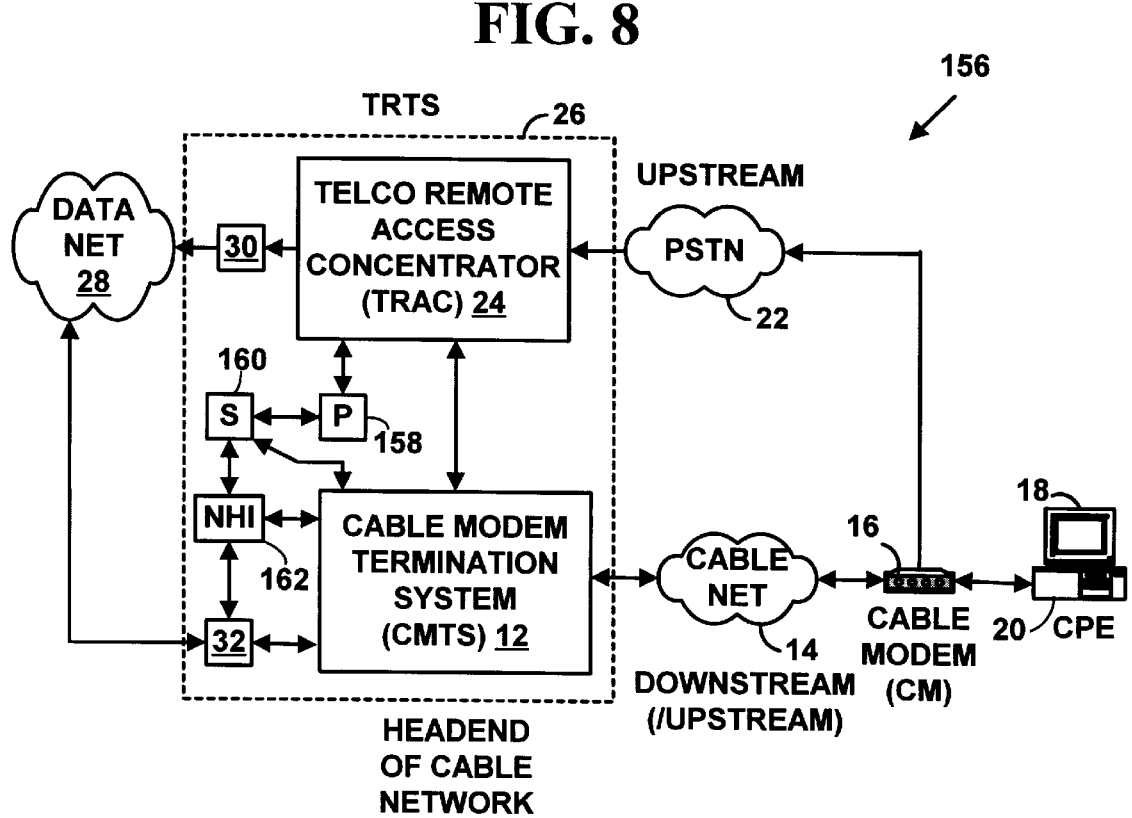
FIG. 8 is a block diagram illustrating a data-over-cable system for the method illustrated in FIGS. 7A and 7B.
Figure 9:
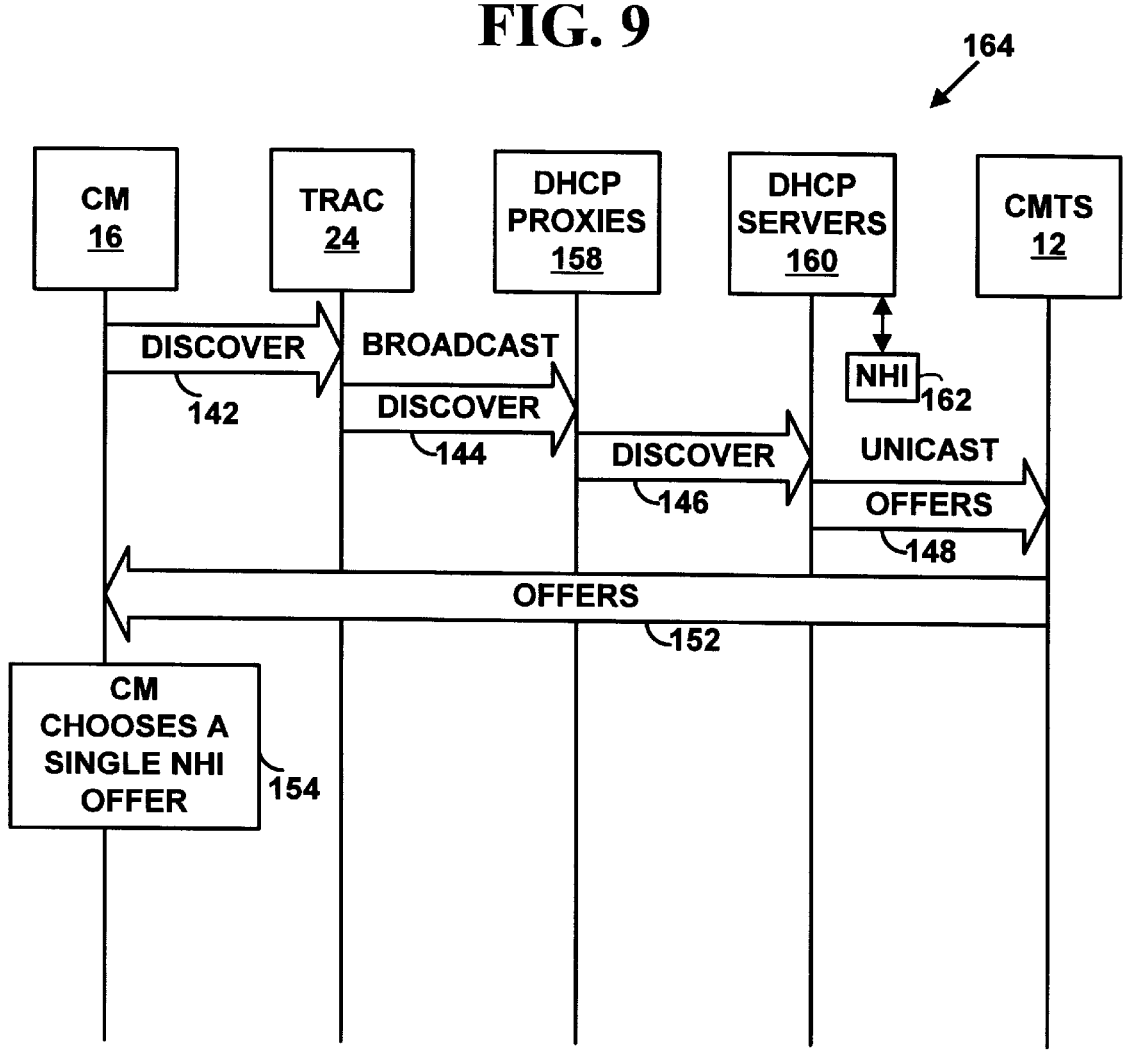
FIG. 9 is a block diagram illustrating the message flow of the method illustrated in FIGS. 7A and 7B.

FIG. 8 is a block diagram illustrating a data-over-cable system 156 for the method illustrated in FIGS. 7A and 7B. Data-over-cable system 156 includes DHCP 66 proxies 158, DHCP 66 servers 160 and associated Network Host Interfaces 162 available on CMTS 12. Multiple DHCP 66 proxies 158, DHCP 66 servers 160 and network host interfaces 162 are illustrated as single boxes in FIG. 8. FIG. 8 also illustrates DHCP 66 proxies 158 separate from TRAC 24. In one embodiment of the present invention, TRAC 24 includes DHCP 66 proxy functionality and no separate DHCP 66 proxies 158 are used. In such an embodiment, TRAC 24 forwards DHCP 66 messages using DHCP 66 giaddr-field 130 to DHCP 66 servers 160 available on CMTS 12. FIG. 9 is a block diagram illustrating a message flow 162 of method 140 (FIGS. 7A and 7B).

Message flow 162 includes DHCP proxies 158 and DHCP servers 160 illustrated in FIG. 8 Steps 142, 144, 146, 148, 150 and 154 of method 140 (FIGS. 7A and 7B) are illustrated in FIG. 9. In one embodiment of the present invention, DHCP proxies 158 are not separate entities, but are included in TRAC 24. In such an embodiment, DHCP proxy services are provided directly by TRAC 24.

Resolving addresses for network host interfaces

Figure 10A:
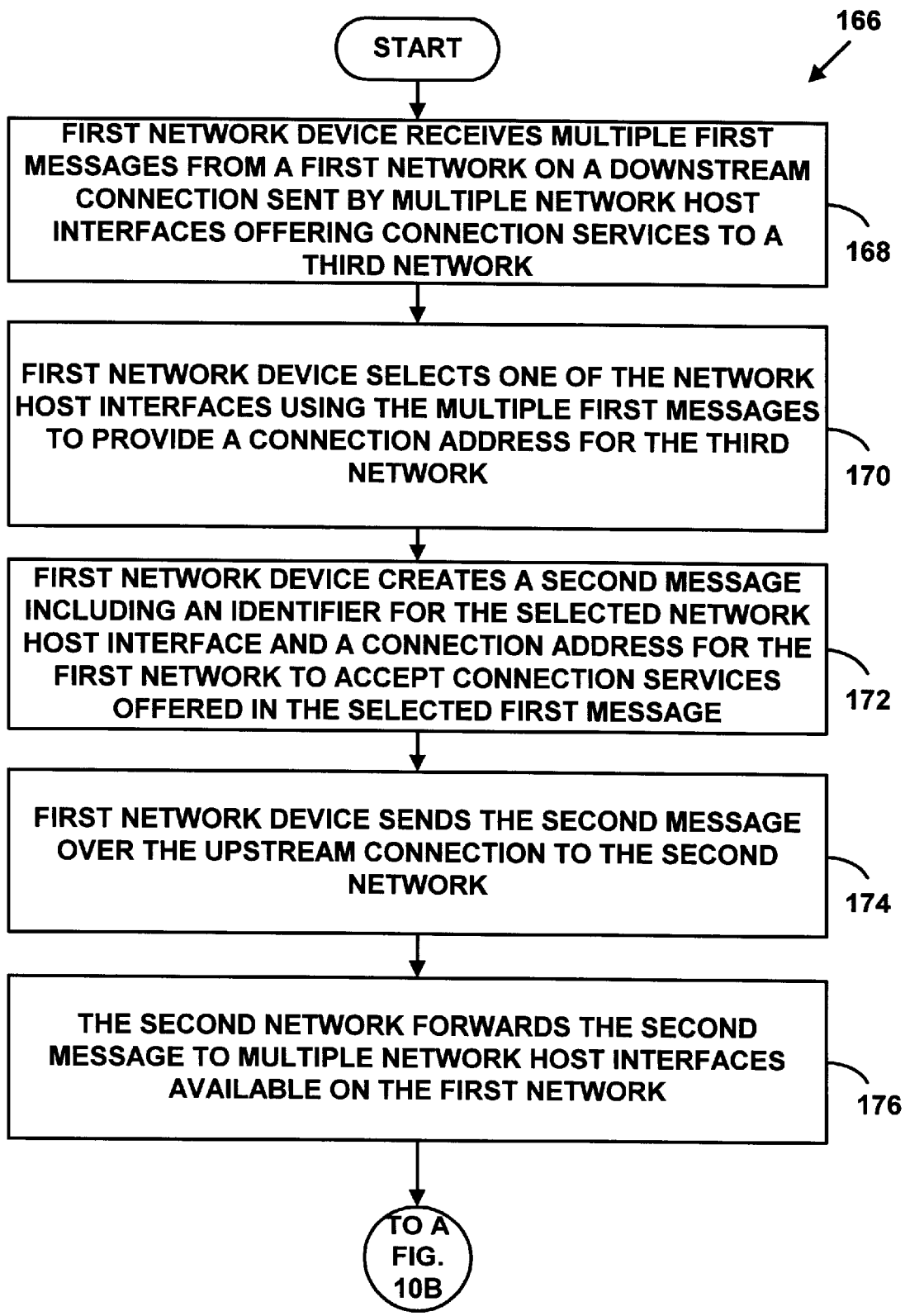
FIGS. 10A and 10B are a flow diagram illustrating a method for resolving host addresses in a data-over-cable system.
Figure 10B:
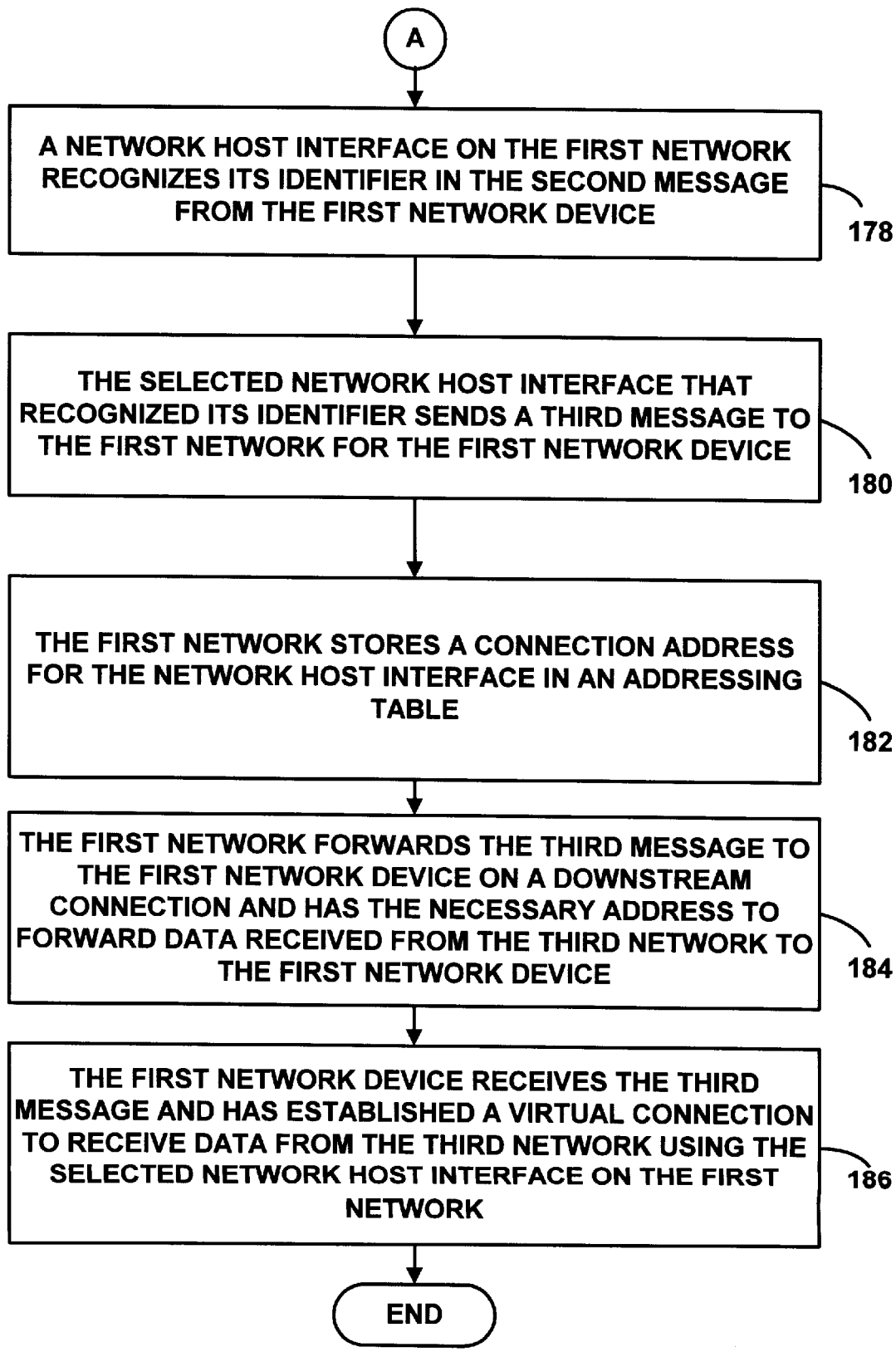

Since CM 16 receives multiple DHCPOFFER messages (Step 152 FIG. 7B) CM 16 resolves and acknowledges one offer from a selected network host interface. FIGS. 10A and 10B are a flow diagram illustrating a method 166 for resolving and acknowledging host addresses in a data-over-cable system. Method 166 includes a first network device that is connected to a first network with a downstream connection of a first connection type, and connected to a second network with an upstream connection of a second connection type. The first and second networks are connected to a third network with a third connection type. In one embodiment of the present invention, the first network device is CM 16, the first network is cable network 14, the second network is PSTN 22 and the third network is data network 28 (e.g., the Internet). The downstream connection is a cable television connection, the upstream connection is a telephony connection, and the third connection is an IP connection.

Turning to FIG. 10A, one or more first messages are received on the first network device from the first network on the downstream connection at step 168. The one or more first messages are offers from one or more network host interfaces available on the first network to provide the first network device a connection to the third network. The first network device selects one of the network host interfaces using message fields in one of the one or more first messages at step 170. The first network device creates a second message with a second message type to accept the offered services from a selected network host interface at step 172. The second message includes a connection address for the first network in a first message field and an identifier to identify the selected network host interface in a second message field.

The first network device sends the second message over the upstream connection to the second network at step 174. The second network uses the first message field in the second message to forward the second message to the one or more network host interfaces available on first network at step 176.

A network host interface available on the first network identified in second message field in the second message from the first network device recognizes an identifier for the network host interface at 178 in FIG. 10B. The selected network host interface sends a third message with a third message type to the first network at step 180. The third message is an acknowledgment for the first network device that the selected network host interface received the second message from the first network device. The first network stores a connection address for the selected network interface in one or more tables on the first network at step 182. The first network will forward data from the third network to the first network device when it is received on the selected network host interface using the connection address in the one or more routing tables. The first network forwards the third message to the first network device on the downstream connection at step 184. The first network device receives the third message at step 186. The first network and the first network device have the necessary addresses for a virtual connection that allows data to be sent from the third network to a network host interface on the first network, and from the first network over the downstream connection to the first network device. Method 166 accomplishes resolving network interface hosts addresses from a cable modem in a data-over-cable with telephony return.

Method 166 of the present invention is used in data-over-cable system 10 with telephony return. However, the present invention is not limited to data-over-cable system 10 with telephony return and can be used in data-over-cable system 10 without telephony return by using an upstream cable channel instead of an upstream telephony channel.

Figure 11A:
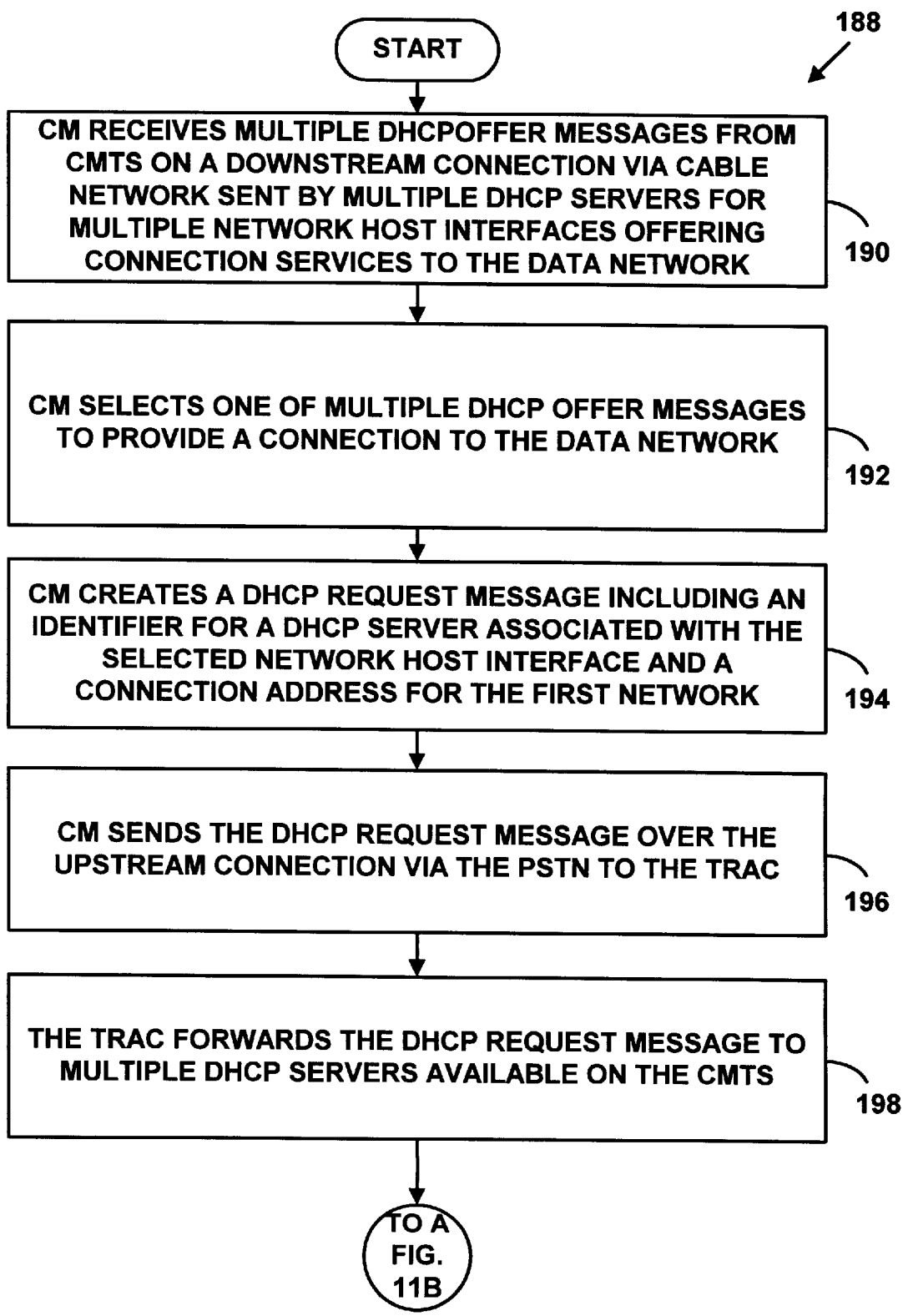
FIGS. 11A and 11B are a flow diagram illustrating a method for resolving discovered host addresses.
Figure 11B:
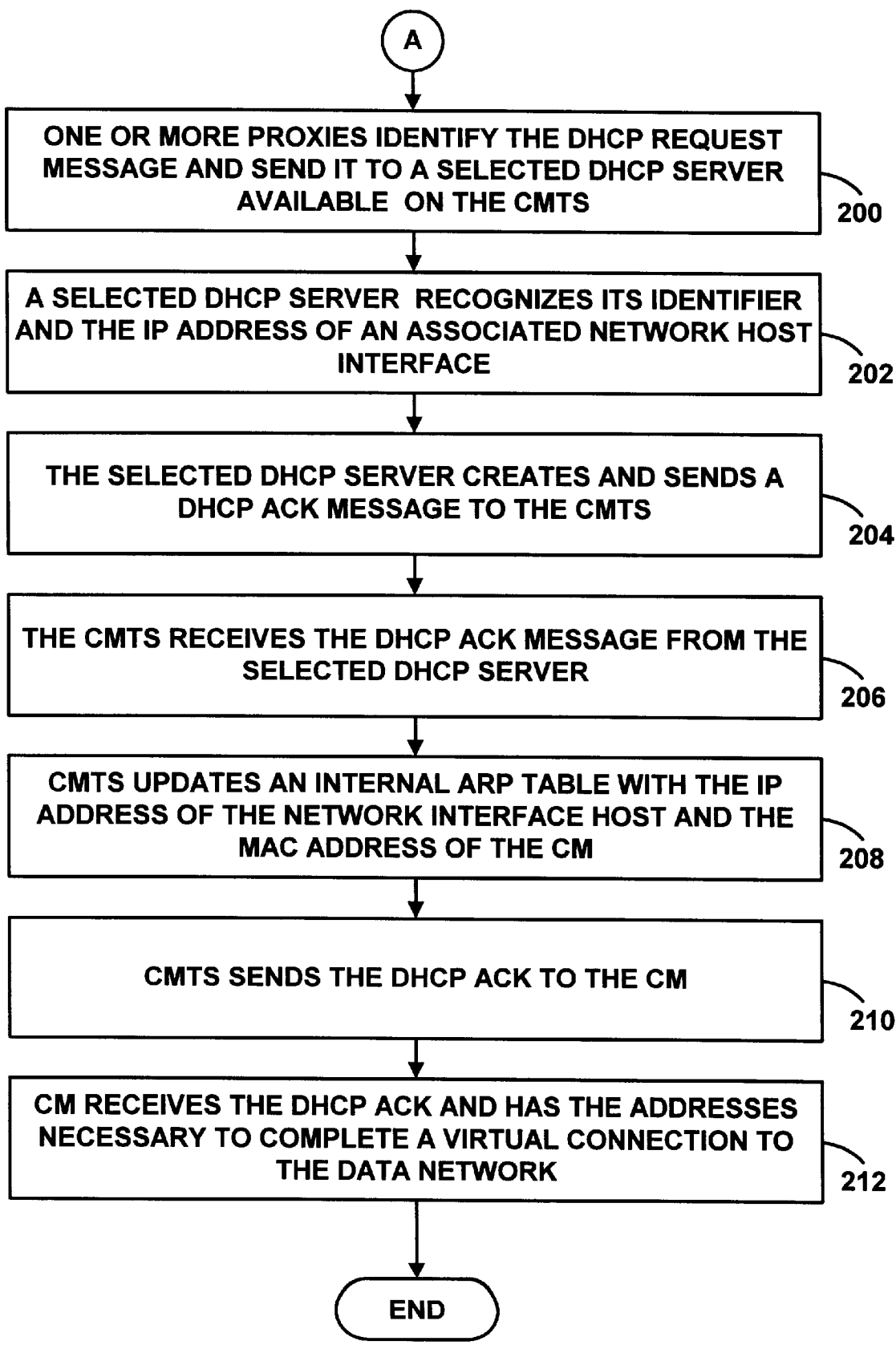

FIGS. 11A and 11B are a flow diagram illustrating a method 188 for resolving discovered host addresses in data-over-cable system 10 with telephony return. At step 190 in FIG. 11A, CM 16 receives one or more DHCPOFFER messages from one or more DHCP 66 servers associated with one or more network host interfaces (e.g., at step 168 in method 166). The one or more DHCPOFFER messages include DHCP 66 fields set as illustrated in Table 7 above. However, other field settings could also be used. At step 192, CM 16 selects one of the DHCPOFFER messages (see also, step 170 in method 166). At step 194, CM 16 creates a DHCP 66 request message ("DHCPREQUEST") message to request the services offered by a network host interface selected at step 192. The fields of the DHCP request message are set as illustrated in Table 8. However, other field settings may also be used.

TABLE 8

| DHCP 66 Parameter | Description |
| --- | --- |
| OP 110 | Set to BOOTREQUEST. |
| HTYPE 112 | Set to network type (e.g. one for 10 Mbps Ethernet). |
| HLEN 114 | Set to network length (e.g., six for 10 Mbps Ethernet) |
| HOPS 116 | Set to zero. |
| FLAGS 118 | Set BROADCAST bit to zero. |
| CIADDR 124 | If CM 16 has previously been assigned an IP address, the IP address is placed in this field. If CM 16 has previously been assigned an IP address by DHCP 66, and also has been assigned an address via IPCP, CM 16 places the DHCP 66 IP 54 address in this field. |
| YIADDR 126 | IP 54 address sent from the selected network interface host in DCHPOFFER message |
| GIADDR 130 | CM 16 places the Downstream Channel IP 54 address 80 CMTS 12 obtained in TSI message 76 on a cable downstream channel in this field. |
| CHADDR 132 | CM 16 places its 48-bit MAC 44 LAN address in this field. |
| SNAME 134 | DHCP 66 server identifier for the selected network interface host |

The DHCPREQUEST message is used to "request" services from the selected IP 54 host interface available on CMTS 12 using a DHCP 66 server associated with the selected network host interface. DHCP 66 giaddr-field 130 (FIG. 6) includes the downstream channel IP address 80 for CMTS 12 obtained in TSI message 76 (e.g., the first message-field from step 172 of method 166). Putting the downstream channel IP address 80 obtained in TSI message 76 allows the DHCPREQUEST message to be forwarded by TRAC 24 to DCHP 66 servers associated with network host interfaces available on CMTS 12. DHCP 66 giaddr-field 126 contains an identifier (second message field, step 172 in method 166) DHCP 66 sname-field 134 contains a DHCP 66 server identifier associated with the selected network interface.

If DHCP 66 giaddr-field 130 in a DHCP message from a DHCP 66 client is non-zero, a DHCP 66 server sends any return messages to a DHCP 66 server port on a DHCP 66 relaying agent (e.g., CMTS 12) whose address appears in DHCP 66 giaddr-field 130. If DHCP 66 giaddr-field 130 is zero, the DHCP 66 client is on the same subnet as the DHCP 66 server, and the DHCP 66 server sends any return messages to either the DHCP 66 client's network address, if that address was supplied in DHCP 66 ciaddr-field 124, or to the client's hardware address specified in DHCP 66 chaddr-field 132 or to the local subnet broadcast address.

Returning to FIG. 11A at step 196, CM 16 sends the DHCPREQUEST message on the upstream connection to TRAC 24 via PSTN 22. At step 198, a DHCP 66 layer on TRAC 24 broadcasts the DHCPREQUEST message on its local network leaving DHCP 66 giaddr-field 130 intact since it already contains a non-zero value. TRAC's 24 local network includes connections to one or more DHCP 66 proxies. The DHCP 66 proxies accept DHCP 66 messages originally from CM 16 destined for DHCP 66 servers associated with network host interfaces available on CMTS 12. In another embodiment of the present invention, TRAC 24 provides the DHCP 66 proxy functionality, and no separate DHCP 66 proxies are used.

The one or more DHCP 66 proxies on TRAC's 24 local network message forwards the DHCPOFFER to one or more of the DHCP 66 servers associated with network host interfaces (e.g., IP 54 interfaces) available on CMTS 12 at step 200 in FIG. 11B. Since DHCP 66 giaddr-field 130 in the DHCPDISCOVER message sent by CM 16 is already non-zero (i.e., contains the downstream IP address of CMTS 12), the DHCP 66 proxies leave DHCP 66 giaddr-field 130 intact.

One or more DHCP 66 servers for the selected network host interfaces (e.g., IP 54 interface) available on CMTS 12 receives the DHCPOFFER message at step 202. A selected DHCP 66 server recognizes a DHCP 66 server identifier in DHCP 66 sname-field 134 or the IP 54 address that was sent in the DCHPOFFER message in the DHCP 66 yiaddr-field 126 from the DHCPREQUST message as being for the selected DHCP 66 server.

The selected DHCP 66 server associated with network host interface selected by CM 16 in the DHCPREQUEST message creates and sends a DCHP 66 acknowledgment message ("DHCPACK") to CMTS 12 at step 204. The DHCPACK message is sent with the message fields set as illustrated in Table 9. However, other field settings can also be used. DHCP 66 yiaddr-field again contains the IP 54 address for the selected network host interface available on CMTS 12 for receiving data packets from data network 28.

TABLE 9

| DHCP 66 Parameter | Description |
| --- | --- |
| FLAGS 122 | Set a BROADCAST bit to zero. |
| YIADDR 126 | IP 54 address for the selected network host interface to allow CM 16 to receive data from data network 28. |
| SIADDR 128 | An IP 54 address for a TFTP 64 server to download configuration information for an interface host. |
| CHADDR 132 | MAC 44 address of CM 16. |
| SNAME 134 | DHCP 66 server identifier associated with the selected network host interface. |
| FILE 136 | A configuration file name for an network interface host. |

The selected DHCP 66 server sends the DHCACK message to the address specified in DHCP 66 giaddr-field 130 from the DHCPREQUEST message to CM 16 to verify the selected network host interface (e.g., IP 54 interface) will offer the requested service (e.g., IP 54 service).

At step 206, CMTS 12 receives the DHCPACK message from the selected DHCP 66 server associated with the selected network host interface IP 54 address(e.g., IP 54 interface). CMTS 12 examines DHCP 66 yiaddr-field 126 and DHCP 66 chaddr-field 132 in the DHCPOFFER messages. DHCP 66 yiaddr-field 126 contains an IP 54 address for a network host IP 54 interface available on CMTS 12 and used for receiving IP 54 data packets from data network 28 for CM 16. DHCP 66 chaddr-field 132 contains the MAC 44 layer address for CM 16 on a downstream cable channel from CMTS 12 via cable network 14.

CMTS 12 updates an Address Resolution Protocol ("ARP") table and other routing tables on CMTS 12 to reflect the addresses in DHCP 66 yiaddr-field 126 and DHCP 66 chaddr-field 132 at step 208. As is known in the art, ARP allows a gateway such as CMTS 12 to forward any datagrams from a data network such as data network 28 it receives for hosts such as CM 16. ARP is defined in RFC-826, incorporated herein by reference.

CMTS 12 stores a pair of network address values in the ARP table, the IP 54 address of the selected network host interface from DHCP 66 yiaddr-field 126 and a Network Point of Attachment ("NPA") address. In an illustrative embodiment of the present invention, The NPA address is a MAC 44 layer address for CM 16 via a downstream cable channel. The IP/NPA address pair are stored in local routing tables with the IP/NPA addresses of hosts (e.g., CMs 16) that are attached to cable network 14.

At step 210, CMTS 12 sends the DHCPACK message to CM 16 via cable network 14. At step 212, CM 16 receives the DHCPACK message, and along with CMTS 12 has addresses for a virtual connection between data network 28 and CM 16. When data packets arrive on the IP 54 address for the selected host interface they are sent to CMTS 12 and CMTS 12 forwards them using a NPA (i.e., MAC 44 address) from the routing tables on a downstream channel via cable network 14 to CM 16.

If a BROADCAST bit in flags field 124 is set to one in the DHCPACK, CMTS 12 sends the DHCPACK messages to a broadcast IP 54 address (e.g., 255.255.255.255). DHCP 66 chaddr-field 132 is still used to determine that MAC layer address. If the BROADCAST bit in flags field 122 is set, CMTS 12 does not update the ARP table or offer routing tables based upon DHCP 66 yiaddr-field 126 and DHCP 66 chaddr-field 132 pair when a broadcast message is sent.

Figure 12:
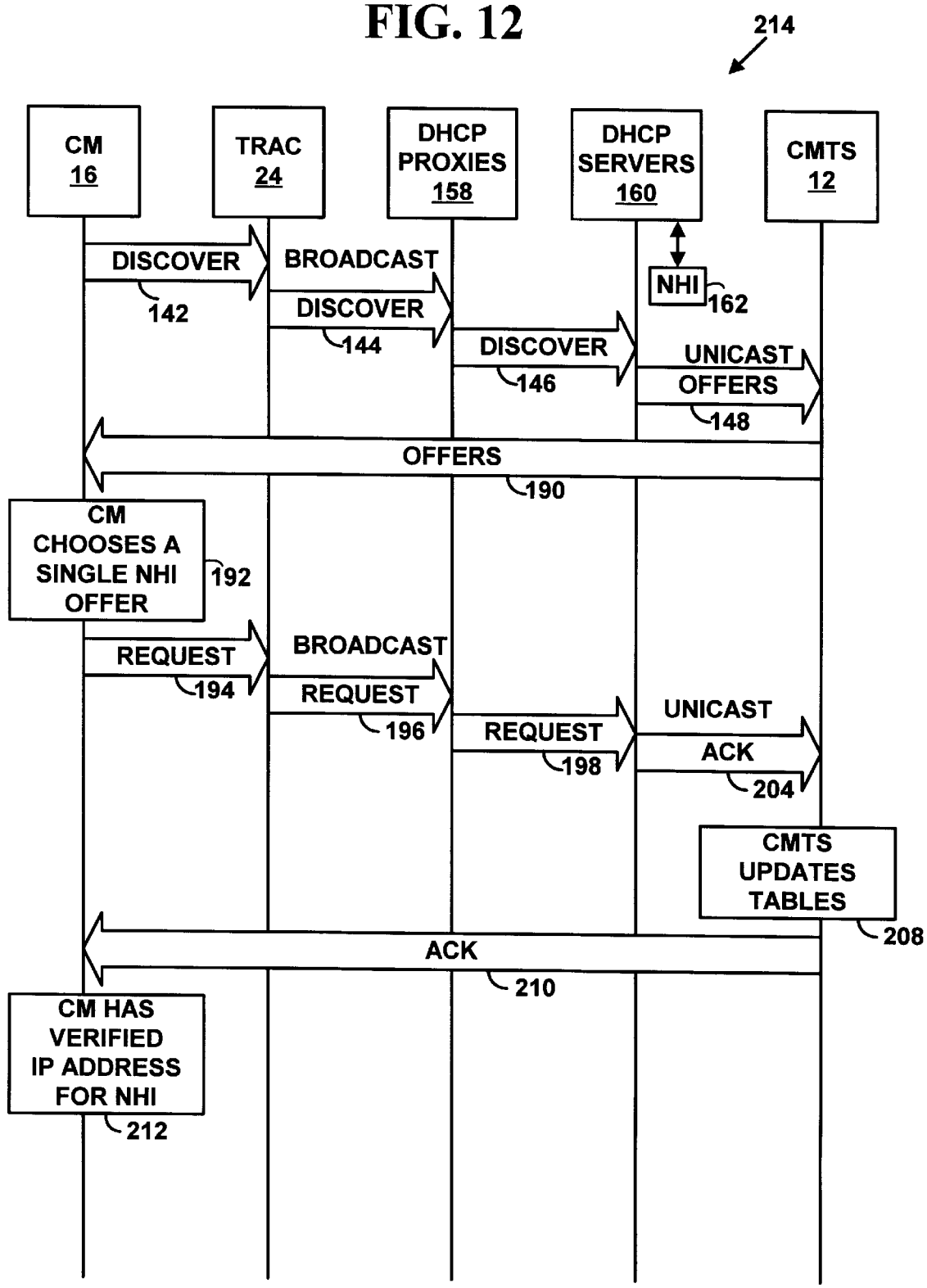
FIG. 12 is a block diagram illustrating the message flow of the method illustrated in FIG. 10.

FIG. 12 is a block diagram illustrating the message flow 214 of the method 188 illustrated in FIGS. 11A and 11B. Message flow 214 includes DHCP proxies 158 and DHCP servers 160 illustrated in FIG. 8. Method steps 194, 196, 198, 204, 208, 210 and 212 of method 188 (FIGS. 11A and 11B) are illustrated in FIG. 12. In one embodiment of the present invention, DHCP proxies 158 are not separate entities, but are included in TRAC 24. In such an embodiment, DHCP proxy services are provided directly by TRAC 24.

After method 188, CMTS 12 has a valid IP/MAC address pair in one or more address routing tables including an ARP table to forward IP 54 data packets from data network 28 to CM 16, thereby creating a virtual IP 54 data path to/from CM 16 as was illustrated in method 92 (FIG. 5) and Table 3. CM 16 has necessary parameters to proceed to the next phase of initialization, a download of a configuration file via TFTP 64. Once CM 16 has received the configuration file and has been initialized, it registers with CMTS 12 and is ready to receive data from data network 14.

In the event that CM 16 is not compatible with the configuration of the network host interface received in the DHCPACK message, CM 16 may generate a DHCP 66 decline message ("DHCPDECLINE") and transmit it to TRAC 24 via PSTN 22. A DHCP 66 layer in TRAC 24 forwards the DHCPDECLINE message to CMTS 12. Upon seeing a DHCPDECLINE message, CMTS 12 flushes its ARP tables and routing tables to remove the now invalid IP/MAC pairing. If an IP 54 address for a network host interface is returned that is different from the IP 54 address sent by CM 16 in the DCHCPREQUEST message, CM 16 uses the IP 54 address it receives in the DHCPACK message as the IP 54 address of the selected network host interface for receiving data from data network 28.

The present invention is described with respect to, but is not limited to a data-over-cable-system with telephony return. Method 188 can also be used with a cable modem that has a two-way connection (i.e., upstream and downstream) to cable network 14 and CMTS 12. In a data-over-cable-system without telephony return, CM 16 would broadcast the DHCPREQUEST message to one or more DHCP 66 servers associated with one or more network host interfaces available on CMTS 12 using an upstream connection on data network 14 including the IP 54 address of CMTS 12 in DHCP 66 giaddr-field 130. Method 188 accomplishes resolving addresses for network interface hosts from a cable modem in a data-over-cable with or without telephony return, and without extensions to the existing DHCP protocol.

CPE initialization in a data-over-cable system

Figure 13A:
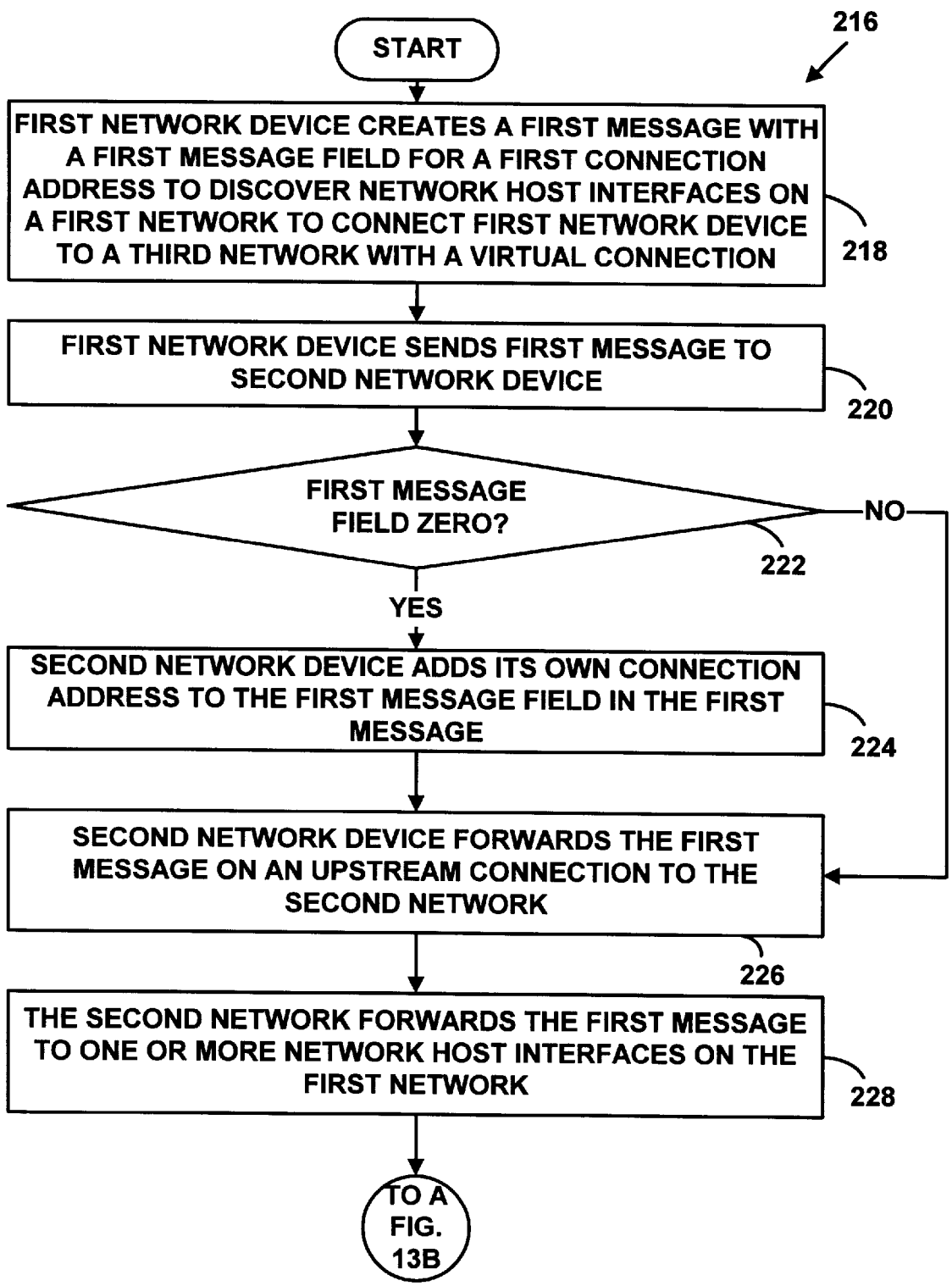
FIGS. 13A and 13B arc a flow diagram illustrating a method for obtaining addresses for customer premise equipment.
Figure 13B:
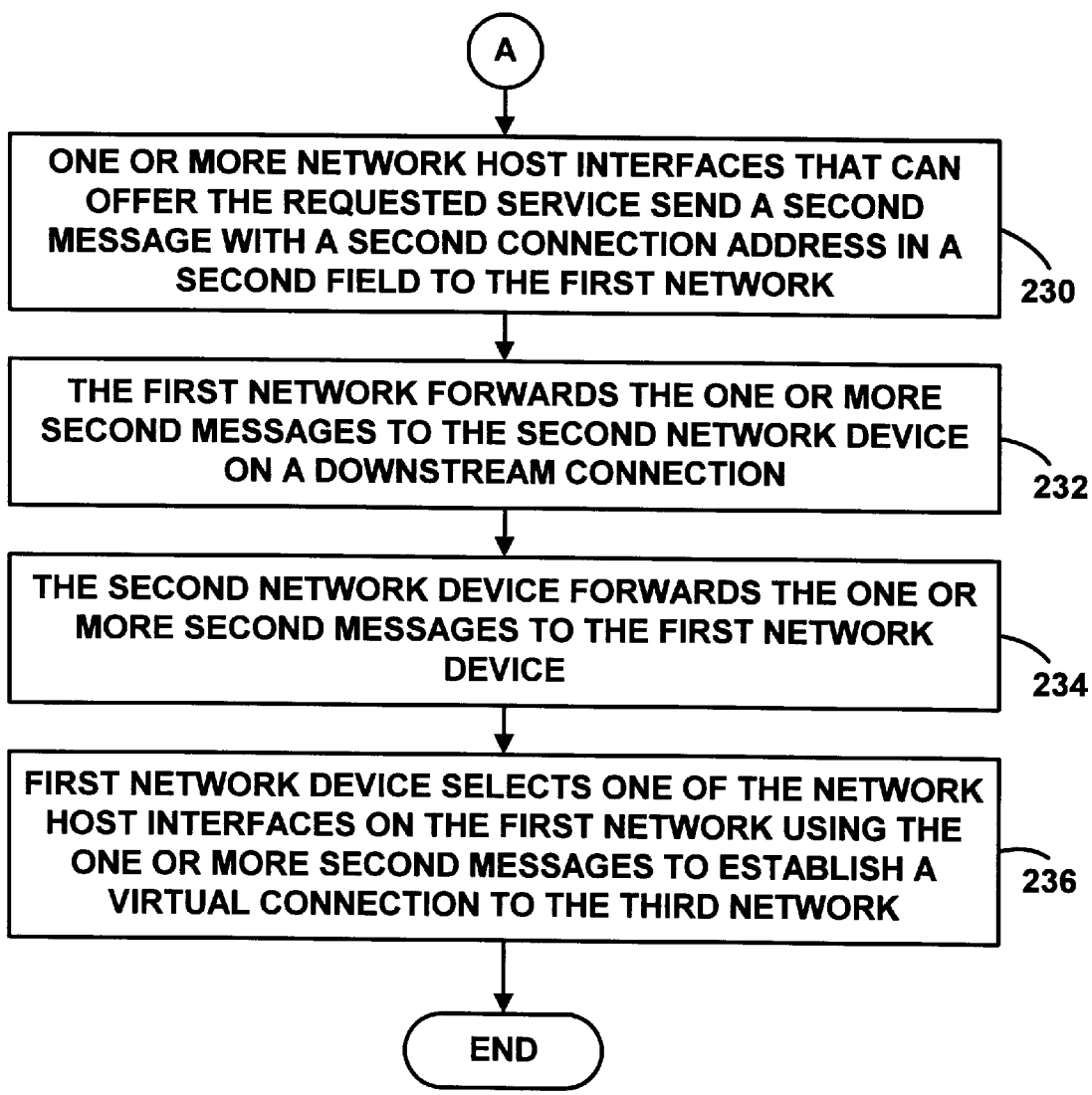

CPE 18 also uses DHCP 66 to generate requests to obtain IP 54 addresses to allow CPE 18 to also receive data from data network 28 via CM 16. In an illustrative embodiment of the present invention, CM 16 functions as a standard BOOTP relay agent/DHCP Proxy 158 to facilitate CPE's 18 access to DHCP 66 server 160. FIGS. 13A and 13B are a flow diagram illustrating a method 216 for obtaining addresses for customer premise equipment. CM 16 and CMTS 12 use information from method 214 to construct IP 54 routing and ARP table entries for network host interfaces 162 providing data to CMCI 20 and to CPE 18.

Method 216 in FIGS. 13A and 13B includes a data-over-cable system with telephony return and first network device with a second network device for connecting the first network device to a first network with a downstream connection of a first connection type, and for connecting to a second network with an upstream connection of a second connection type. The first and second networks are connected to a third network with a third connection type.

In one embodiment of the present invention, data-over-cable system with telephony return is data-over-cable system 10 with the first network device CPE 18 and the second network device CM 16. The first network is cable television network 14, the downstream connection is a cable television connection, the second network is PSTN 22, the upstream connection is a telephony connection, the third network is data network 28 (e.g., the Internet or an intranet) and the third type of connection is an IP 54 connection. However, the present invention is not limited to the network components described and other network components may also be used. Method 216 allows CPE 18 to determine an IP 54 network host interface address available on CMTS 12 to receive IP 54 data packets from data network 54, thereby establishing a virtual IP 54 connection with data network 28 via CM 16.

Returning to FIG. 13A at step 218, a first message of a first type (e.g., a DHCP 66 discover message) with a first message field for a first connection is created on the first network device. The first message is used to discover a network host interface address on the first network to allow a virtual connection to the third network.

At step 220, the first network device sends the first message to the second network device. The second network device checks the first message field at step 222. If the first message field is zero, the second network device puts its own connection address into the first message field at step 224. The second network device connection address allows the messages from network host interfaces on the first network to return messages to the second network device attached to the first network device. If the first message field is non-zero, the second network device does not alter the first message field since there could be a relay agent attached to the first network device that may set the first connection address field.

At step 226, the second network device forwards the first message to a connection address over the upstream connection to the second network. In one embodiment of the present invention, the connection address is an IP broadcast address (e.g., 255.255.255.255). However, other connection addresses can also be used.

The second network uses the first connection address in the first message field in the first message to forward the first message to one or more network host interfaces (e.g., IP 54 network host interfaces) available on first network at step 228. One or more network host interfaces available on the first network that can provide the services requested in first message send a second message with a second message type with a second connection address in a second message field to the first network at step 230 in FIG. 13B. The second connection address allows the first network device to receive data packets from the third network via a network host interface on the first network. The first network forwards the one or more second messages on the downstream connection to the second network device at step 232. The second network device forwards the one or more second messages to the first network device at step 234. The first network device selects one of the one or more network host interfaces on the first network using the one or more second messages at step 236. This allows a virtual connection to be established between the third network and the first network device via the selected network host interface on the first network and the second network device.

Figure 14B:
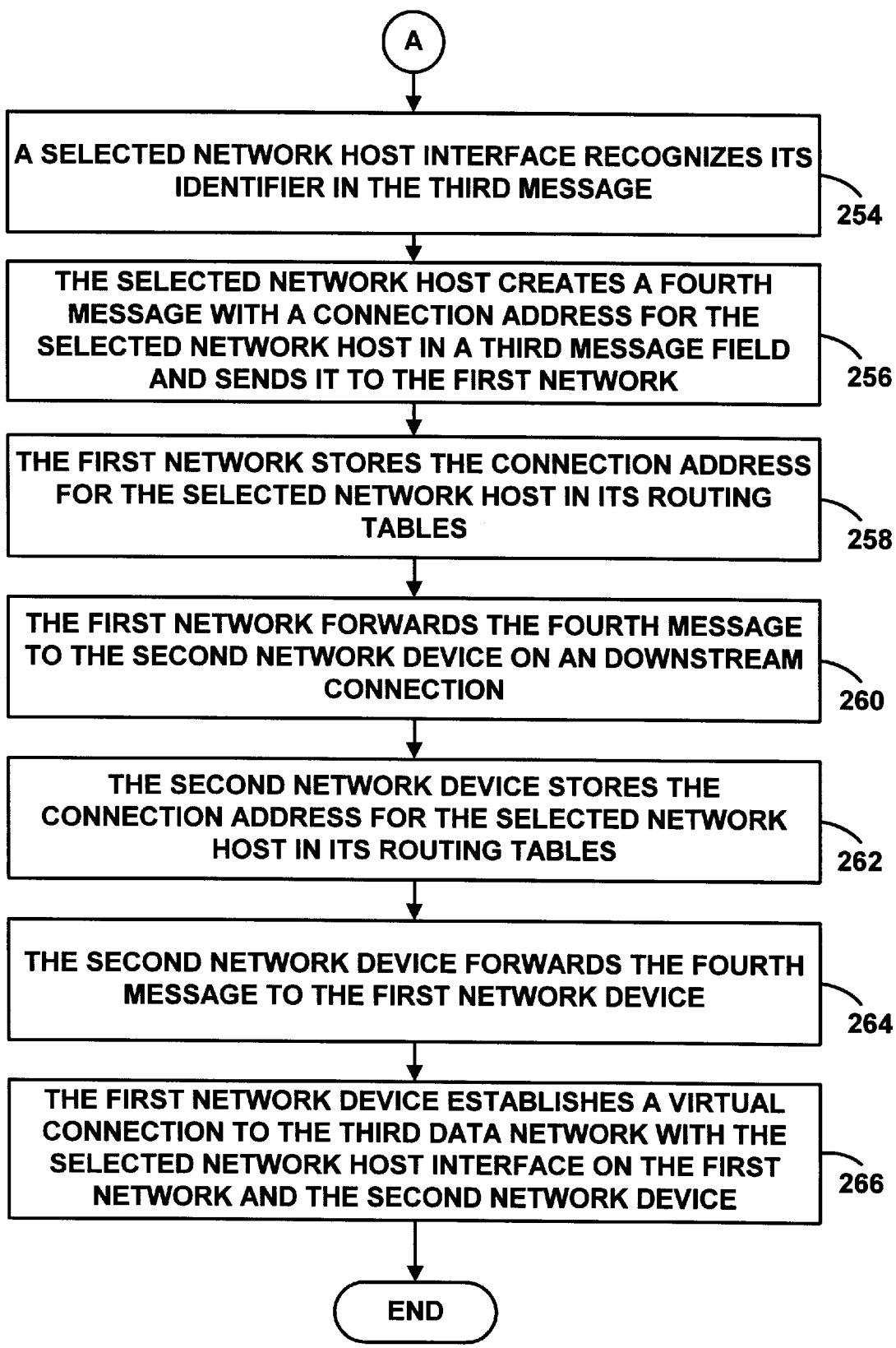

FIGS. 14A and 14B are a flow diagram illustrating a method 240 for resolving addresses for the network host interface selected by a first network device to create a virtual connection to the third network. Turning to FIG. 14A, at step 240 one or more second messages are received with a second message type on the first network device from the second network device from the first network on a downstream connection at step 242. The one or more second messages are offers from one or more protocol servers associated with one or more network host interfaces available on the first network to provide the first network device a connection to the third network. The first network device selects one of the network host interfaces using one of the one or more second messages at step 244. The first network device creates a third message with a third message type to accept the offered services from the selected network host interface at step 246. The third message includes a connection address for the first network in a first message field and an identifier to identify the selected network host interface in a second message field. At step 248, first network device equipment sends the third message to the second network device.

The second network device sends the third message over the upstream connection to the second network at step 250.

The second network uses the first message field in the third message to forward the third message to the one or more network host interfaces available on first network at step 252.

A network host interface available on the first network identified in second message field in the third message from the first network device recognizes an identifier for the selected network host interface at step 254 in FIG. 14B. The selected network host interface sends a fourth message with a fourth message type to the first network at step 256. The fourth message is an acknowledgment for the first network device that the selected network host interface received the third message. The fourth message includes a second connection address in a third message field. The second connection address is a connection address for the selected network host interface. The first network stores the connection address for the selected network interface from the third message in one or more routing tables (e.g., an ARP table) on the first network at step 258. The first network will forward data from the third network to the first network device via the second network device when it is received on the selected network host interface using the connection address from the third message field. The first network forwards the fourth message to the second network device on the downstream connection at step 260. The second network device receives the fourth message and stores the connection address from the third message field for the selected network interface in one or more routing tables on the second network device at step 262. The connection address for the selected network interface allows the second network device to forward data from the third network sent by the selected network interface to the customer premise equipment.

At step 264, the second network device forward the fourth message to the first network device. At step 266, the first network device establishes a virtual connection between the third network and the first network device.

After step 266, the first network, the second network device and the first network device have the necessary connection addresses for a virtual connection that allows data to be sent from the third network to a network host interface on the first network, and from the first network over the downstream connection to the second network and then to the first network device. In one embodiment of the present invention, method 240 accomplishes resolving network interface hosts addresses from customer premise equipment with a cable modem in a data-over-cable with telephony return without extensions to the existing DHCP protocol.

Methods 216 and 240 of the present invention are used in data-over-cable system with telephony return with CM 16 and CPE 18. However, the present invention is not limited to data-over-cable system 10 with telephony return and can be used in data-over-cable system 10 without telephony return by using an upstream cable channel instead of an upstream telephony channel.

Figure 15B:
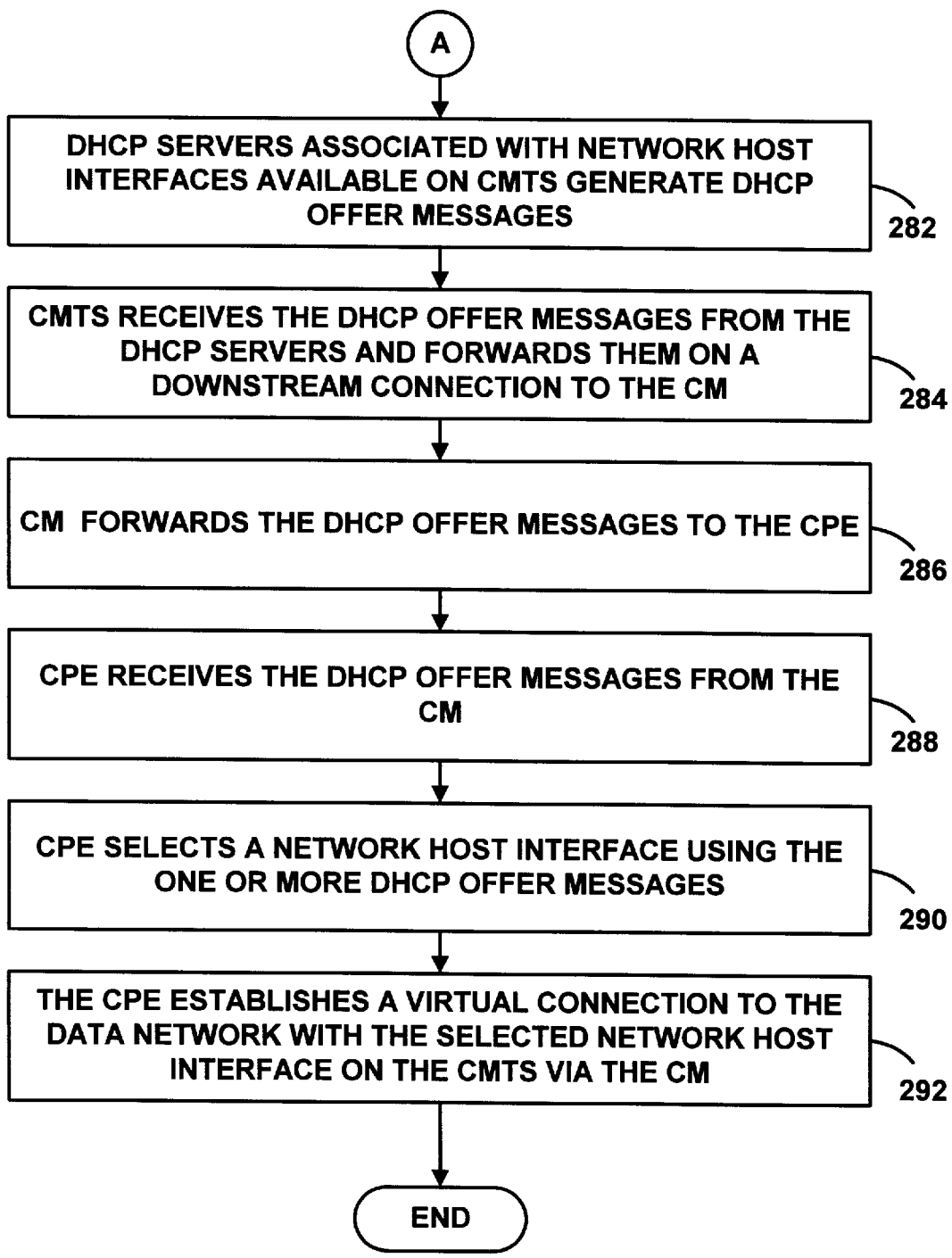

FIGS. 15A and 15B are a flow diagram illustrating a method 268 for addressing network host interfaces from CPE 18. At step 270 in FIG. 15A, CPE 18 generates a DHCPDISCOVER message broadcasts the DHCPDISCOVER message on its local network with the fields set as illustrated in Table 6 above with addresses for CPE 18 instead of CM 16. However, more or fewer field could also be set. CM 16 receives the DHCPDISCOVER as a standard BOOTP relay agent at step 272. The DHCP DISCOVER message has a MAC 44 layer address for CPE 18 in DHCP 66 chaddr-field 132, which CM 16 stores in one or more routing tables. As a BOOTP relay agent, the CM 16 checks the DHCP 66 giaddr-field 130 (FIG. 6) at step 274. If DHCP 66 giaddr-field 130 is set to zero, CM 16 put its IP 54 address into DHCP 66 giaddr-field 130 at step 276.

If DHCP 66 giaddr-field 130 is non-zero, CM 16 does not alter DHCP 66 giaddr-field 130 since there could be another BOOTP relay agent attached to CPE 18 which may have already set DHCP 66 giaddr-field 130. Any BOOTP relay agent attached to CPE 18 would have also have acquired its IP 54 address from using a DCHP 66 discovery process (e.g., FIG. 12).

Returning to FIG. 15A, at step 278, CM 16 broadcasts the DHCPDISCOVER message to a broadcast address via PSTN 22 to TRAC 24. In one embodiment of the present invention, the broadcast address is an IP 54 broadcast address (e.g., 255.255.255.255). At step 280, one or more DHCP 66 proxies 158 associated with TRAC 24, recognize the DHCPDISOVER message, and forward it to one or more DHCP 66 servers 160 associated with one or more network host interfaces 162 available on CMTS 12. Since DHCP 66 giaddr-field 130 is already non-zero, the DHCP proxies leave DHCP 66 giaddr-field 130 intact. In another embodiment of the present invention, TRAC 24 includes DCHP 66 proxy 158 functionality and no separate DHCP 66 proxies 158 are used.

At step 282 in FIG. 15B, the one or more DHCP servers 160 receive the DHCPDISCOVER message from one or more DHCP proxies, and generate one or more DHCPOFFER messages to offer connection services for one or more network host interfaces 162 available on CMTS 12 with the fields set as illustrated in Table 7. The one or more DHCP servers 160 send the one or more DHCPOFFER messages to the address specified in DHCP 66 giaddr-field 130 (e.g., CM 16 or a BOOTP relay agent on CPE 18), which is an IP 54 address already contained in an ARP or other routing table in CMTS 12. Since CMTS 12 also functions as a relay agent for the one or more DHCP servers 160, the one or more DHCPOFFER messages are received on CMTS 12 at step 284.

CMTS 12 examines DHCP 66 yiaddr-field 126 and DHCP 66 giaddr-field 130 in the DHCPOFFER messages, and sends the DHCPOFFER messages down cable network 14 to IP 54 address specified in the giaddr-field 130. The MAC 44 address for CM 16 is obtained through a look-up of the hardware address associated with DHCP 66 chaddr-field 130. If the BROADCAST bit in DHCP 66 flags-field 122 is set to one, CMTS 12 sends the DHCPOFFER message to a broadcast IP 54 address (e.g., 255.255.255.255), instead of the address specified in DHCP 66 yiaddr-field 126. CMTS 12 does not update its ARP or other routing tables based upon the broadcast DCHP 66 yiaddr-field 126 DHCP 66 chaddr-field 132 address pair.

Returning to FIG. 15B, CM 16 receives the one or more DHCPOFFER messages and forwards them to CPE 18 at step 286. CM 16 uses the MAC 44 address specified determined by DHCP 66 chaddr-field 132 look-up in its routing tables to find the address of CPE 18 even if the BROADCAST bit in DHCP 66 flags-field 122 is set. At step 290, CPE 18 receives the one or more DHCPOFFER messages from CM 16. At step 292, CPE 18 selects one of the DHCPOFFER messages to allow a virtual connection to be established between data network 28 and CPE 18. Method 266 accomplishes addressing network interface hosts from CPE 18 in data-over-cable system 10 without extensions to the existing DHCP protocol.

FIGS. 16A and 16B are a flow diagram illustrating a method 294 for resolving network host interfaces from CPE 18. At step 296, CPE 18 receives the one or more DHCPOFFER messages from one or more DHCP 66 servers associated with one or more network host interface available on CMTS 12. At step 298, CPE 18 chooses one offer of services from a selected network host interface. At step 300, CPE 18 generates a DHCPREQUEST message with the fields set as illustrated in Table 8 above with addresses for CPE 18 instead of CM 16. However, more or fewer fields could also be set. At step 302, CPE 18 sends the DHCPREQUEST message to CM 16. At step 304, CM 16 forwards the message to TRAC 24 via PSTN 22.

At step 306, a DHCP 66 layer on TRAC 24 broadcasts the DHCPREQUEST message on its local network leaving DHCP 66 giaddr-field 130 intact since it already contains a non-zero value. TRAC's 24 local network includes connections to one or more DHCP 66 proxies. The DHCP 66 proxies accept DHCP 66 messages originally from CPE 18 destined for DHCP 66 servers associated with network host interfaces available on CMTS 12. In another embodiment of the present invention, TRAC 24 provides the DHCP 66 proxy functionality, and no separate DHCP 66 proxies are used.

One or more DHCP 66 proxies on TRAC's 24 local network recognize the DHCPOFFER message and forward it to one or more of the DHCP 66 servers associated with network host interfaces (e.g., IP 54 interfaces) available on CMTS 12 at step 308 in FIG. 16B. Since DHCP 66 giaddr-field 130 in the DHCPDISCOVER message sent by CPE 18 is already non-zero, the DHCP 66 proxies leave DHCP 66 giaddr-field 130 intact.

One or more DHCP 66 servers for the selected network host interfaces (e.g., IP 54 interface) available on CMTS 12 receive the DHCPOFFER message at step 310. A selected DHCP 66 server recognizes a DHCP 66 server identifier in DHCP 66 sname-field 134 or the IP 54 address that was sent in the DCHPOFFER message in the DHCP 66 yiaddr-field 126 from the DHCPREQUST message for the selected DHCP 66 server.

The selected DHCP 66 server associated with network host interface selected by CPE 18 in the DHCPREQUEST message creates and sends a DCHP acknowledgment message ("DHCPACK") to CMTS 12 at step 312 using the DHCP 66 giaddr-field 130. The DHCPACK message is sent with the message fields set as illustrated in Table 9. However, other field settings can also be used. DHCP 66 yiaddr-field contains the IP 54 address for the selected network host interface available on CMTS 12 for receiving data packets from data network 28 for CPE 18.

At step 314, CMTS 12 receives the DHCPACK message. CMTS 12 examines the DHCP 66 giaddr-field 130 and looks up that IP address in its ARP table for an associated MAC 44 address. This is a MAC 44 address for CM 16, which sent the DHCPREQUEST message from CPE 18. CMTS 12 uses the MAC 44 address associated with the DHCP 66 giaddr-field 130 and the DHCP 66 yiaddr-field 126 to update its routing and ARP tables reflecting this address pairing at step 316. At step 318, CMTS 12 sends the DHCPACK message on a downstream channel on cable network 14 to the IP 54 and MAC 44 addresses, respectively (i.e., to CM 16). If the BROADCAST bit in the DHCP 66 flags-field 122 is set to one, CMTS 12 sends the DHCPACK message to a broadcast IP 54 address (e.g., 255.255.255.255), instead of the address specified in the DHCP 66 yiaddr-field 126. CMTS 12 uses the MAC 44 address associated with the DHCP 66 chaddr-field 130 even if the BROADCAST bit is set.

CM 16 receives the DHCPACK message. It examines the DHCP 66 yiaddr-field 126 and chaddr-field 132, and updates its routing table and an ARP routing table to reflect the address pairing at step 320. At step 322, CM 16 sends the DHCPACK message to CPE 18 via CMCI 20 at IP 54 and MAC 44 addresses respectively from its routing tables. If the BROADCAST bit in the DHCP 66 flags-field 122 is set to one, CM 16 sends the downstream packet to a broadcast IP 54 address (e.g., 255.255.255.255), instead of the address specified in DHCP 66 yiaddr-field 126. CM 16 uses the MAC 44 address specified in DHCP 66 chaddr-field 132 even if the BROADCAST bit is set to located CPE 18. At step 324, CPE 18 receives the DHCPACK from CM 16 and has established a virtual connection to data network 28.

In the event that CPE 18 is not compatible with the configuration received in the DHCPACK message, CPE 18 may generate a DHCP 66 decline ("DHCPDECLINE") message and send it to CM 16. CM 16 will transmit the DHCPDECLINE message up the PPP 50 link via PSTN 22 to TRAC 24. On seeing a DHCPDECLINE message TRAC 24 sends a unicast copy of the message to CMTS 12. CM 16 and CMTS 12 examine the DHCP 66 yiaddr-field 126 and giaddr-field 130, and update their routing and ARP tables to flush any invalid pairings.

Upon completion of methods 266 and 292, CM 16 CMTS 12 have valid IP/MAC address pairings in their routing and ARP tables. These tables store the same set of IP 54 addresses, but does not associate them with the same MAC 44 addresses. This is because CMTS 12 resolves all CPE 18 IP 54 addresses to the MAC 44 address of a corresponding CM 16. The CMs 16, on other hand, are able to address the respective MAC 44 addresses of their CPEs 18. This also allows DHCP 66 clients associated with CPE 18 to function normally since the addressing that is done in CM 16 and CMTS 12 is transparent to CPE 18 hosts.

FIG. 17 is a block diagram illustrating a message flow 326 for methods 268 and 294 in FIGS. 15A, 15B, and 16A and 16B. Message flow 326 illustrates a message flow for methods 268 and 294, for a data-over-cable system with and without telephony return. In another embodiment of the present invention, CM 16 forwards requests from CPE 18 via an upstream connection on cable network 14 to DHCP servers 160 associated with one or more network host interfaces available on CMTS 12.

Method 268 and 294 accomplishes resolving addresses for network interface hosts from customer premise equipment in a data-over-cable with or without telephony return without extensions to the existing DHCP protocol. Methods 268 and 294 of the present invention are used in data-over-cable system 10 with telephony return. However, the present invention is not limited to data-over-cable system 10 with telephony return and can be used in data-over-cable system 10 without telephony return by using an upstream cable channel instead of an upstream telephony channel.

Management of network services on a data network in a data-over-cable system

Figure 18:
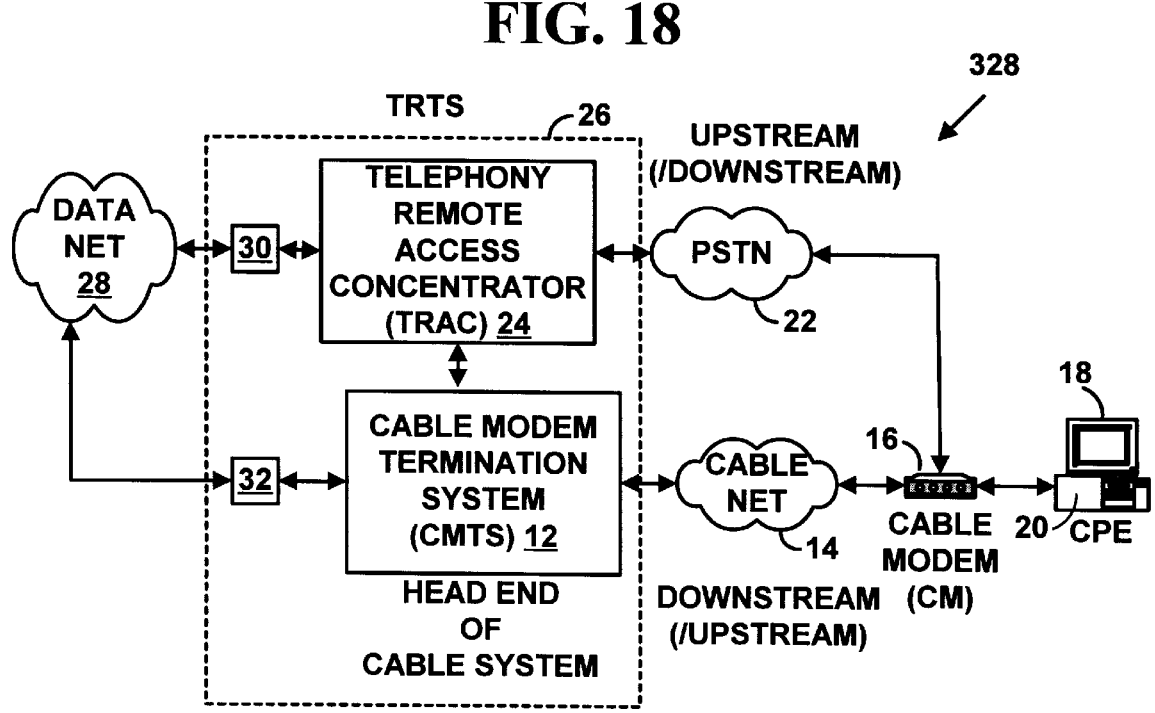
FIG. 18 is a flow diagram illustrating a cable modem system with telephony return.

FIG. 18 is a block diagram illustrating a cable modem system with telephony return 328. Cable modem system with telephony return 328 from FIG. 18 is similar to the cable modem system with telephony return of FIG. 1 except CM 16 has both and upstream and a downstream telephony connection to/from TRAC 24 via PSTN 22.

FIG. 19 is a flow diagram illustrating a method 330 for managing network services on a network device. At step 332, a network device receives a first message on a first downstream connection from a first network. The first message includes a list of network services available to the network device on a third network. At step 334, the list of services from the first message is stored on the network device. At step 336, the network device sends a second message over an upstream connection to a second network. The second message contains a request for one or more network services offered by the third network. At step 338, the network device receives a third message from the second network on a second downstream connection. The third message indicates a status of the request for one or more network services offered by the third network.

In an illustrative embodiment of the present invention, the network device is CM 16, the first message is TSI message 76 (FIG. 4) and the second and third messages are IP 54 messages. However, the invention is not limited to CM 16, TSI message 76 and IP 54 messages and other network devices and messages could also be used.

FIG. 20 is a flow diagram illustrating a method 340 for managing network services from a cable modem. At step 342, CM 16 receives a TSI message 76 from CMTS 12 on a downstream cable connection via cable network 14. A list of services available to CM 16 on data network 28 is included as TLV encoded-data 90. TSI 76 is transmitted as a MAC 44 management message with a message type of MAC management type value of TRI_TSI. However, other first messages or message types can also be used.

In an illustrative embodiment of the present invention, the list of available services included as TLV encoded-data 90 is a small list of services or sites (e.g., network addresses) available to CM 16 on data network 28. The list of available services may contain only a list of a small number of Internet or intranet sites and services CM 16 is allowed to access. For example, CM 16 may be only allowed to access an electronic kiosk HTML document on a company intranet and no other service or site. TLV encoded-data 90 in TSI message 76 would contain the single IP 54 address on the company intranet.

Returning to FIG. 20, at step 344 CM 16 stores the list of services from TSI message 76 in an internal table. At step 346, CM 16 sends a first IP 54 message in a PPP 50 datagram to TRAC 24 as via PSTN 22 over an upstream telephony connection. TRAC 24 forwards the first IP 54 message to data network 28 via TRAC-NSI 30. TRAC 24 receives a second IP 54 message from data network 28 in response to the first IP 54 message via TRAC-NSI 30. In one embodiment of the present invention, the second IP 54 message is sent only to TRAC 24 by data network 28, thereby keeping CMTS 12 and cable network 14 secure from requests for services on data network 28 by CM 16. In another embodiment of the present invention, the IP 54 message is sent to both TRAC 24 and CMTS 12 by data network 28 with TRAC 24 supplying an additional IP 54 address for CMTS 12 when the first IP 54 message is forwarded to data network 28. In an illustrative embodiment of the present invention, only TRAC 24 forwards the second IP 54 message to CM 16 indicating a status of CM's 16 request for services on data network 28.

Returning again to FIG. 20, at step 348 CM 16 receives the second IP 54 message from TRAC 24 via PSTN 22 on a downstream telephony connection. CM 16 uses a two-way telephony pathway through TRAC 24 via PSTN 22 to request services and receive responses from data network 28. In one embodiment of the present invention, CM 16 does not receive response messages from CMTS 12 via cable network 14. As a result, requests from network services are made from CM 16 on lower bandwidth telephony connections instead of using high bandwidth cable connections for administrative tasks and TRAC 24 provides an additional security mechanism as is explained below. In another embodiment of the present invention, CM 16 receives response messages from TRAC 24 via PSTN 22 or CMTS 12 via cable network 14.

FIG. 21 is a flow diagram illustrating a method 350 for managing network services from a computer network. At step 352, a first message is received on a second network from a first network including a list of services available to a network device on a third network. At step 354, the list of services from the first message are stored in an internal table on the second network. At step 356, a second message is received on a second network on an upstream connection from the network device. The second message contains a request for one or more network services on the third network.

At step 358, a test is conducted on the second network to determine whether the network device is allowed to use the one or more services requested in the second message using the list of services stored in the internal table. If so, at step 360 the second message is forwarded to the third network. At step 362, the second network receives a third message from the third network. The third message is a response for the one or more services requested in the first message. At step 364, the second network forwards the third message to the network device over a second downstream connection. If the network device is requesting one or more services on the third network that are not available to the network device (i.e., not in the list of services), the first network sends a fourth message back to the network device indicating a rejection to the request for one or more services on the third network at step 366. Method 350 prevents the network device from using any services not indicated in the first message sent to the second network.

FIG. 22 is a flow diagram illustrating a method 366 for managing network services from a telephony remote termination system. At step 368, TRAC 24 receives a MAC 44 message from CMTS 12 including a list of services available to CM 16 on data network 28. The list of services is stored in an internal table on TRAC 24 at step 370. At step 372, TRAC 24 receives a first IP 54 message from CM 16 via PSTN 22 as a PPP 50 datagram over an upstream telephony connection. At step 374, if CM 16 requests one or more services in the list maintained by TRAC 24 in the internal table, the first IP 54 message containing the request for one or more network services is forwarded to data network 28 at step 376.

At step 378, TRAC 24 receives a second IP 54 message from data network 28 in response to the first IP 54 message sent by CM 16 at step 372. In an illustrative embodiment of the present invention, the second IP 44 message is received on TRAC 24 from data network 28 and not on CMTS 12, which normally receives data packets from data network for the cable modem. In another embodiment of the present invention, the second IP 54 message is received on both TRAC 24 and CMTS 12, but is forwarded to CM 16 only from TRAC 24. In such an embodiment, TRAC 24 supplies data network 28 with an IP 54 address for both TRAC 24 and CMTS 12. In yet another embodiment of the present invention, the second IP 54 message is received on both TRAC 24 and CMTS 12 and is forwarded to CM 16 only over a downstream cable connection via cable network 14.

Returning to FIG. 22, the second IP 54 message is forwarded by TRAC 24 to CM 16 via PSTN 22 over a downstream telephony connection at step 380. If CM 16 is requesting one or more services on data network 28 that are not available to CM 16 at step 374, TRAC 24 sends a third IP 54 message back to CM 16 indicating a rejection to the request for one or more services on data network 28 at step 382. Thus, TRAC 24 provides an additional security mechanism to protect data-over-cable system 328.

The present invention is not limited to the messages and components described for an illustrative embodiment and other messages and components may also be used. An illustrative embodiment of the present invention allows a cable modem to request one or more sites or services available on a data network such as the Internet or an intranet by using a telephony return pathway in the data-over-cable system. However, the present invention may also be used in a data-over-cable system without telephony return using a two-way cable connection, additional MAC 44 management messages, and security checks from method 350 in CMTS 12 instead of TRAC 24.

An illustrative embodiment of the present invention allows a cable modem to request one or more sites or services available on a data network such as the Internet or an intranet by using a telephony return pathway in the data-over-cable system. A cable modem termination system and a telephony remote access concentrator cooperate to restrict services a cable modem can subscribe to. Using a telephony return path improves the security of the cable television system. In addition, the telephony return path is used to provide administrative support on lower bandwidth connections for a data-over-cable system by providing an administrative pathway outside of the higher bandwidth cable television connections.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the steps of the flow diagrams may be taken in sequences other than those described, and more or fewer elements or component may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. In a data-over-cable system including a network device connected to a first network with a first downstream connection of a first connection type, connected to a second network with an upstream connection of a second connection type and connected to the second network with a second downstream connection of a second connection type, the first network and second network connected to a third network with the third connection type, a method of managing network services, the method comprising the following steps:

receiving a first message from the first network on the first downstream connection on the network device, wherein the first message includes a list of services on the third network available to the network device;

storing the list of services from the first message on the network device;

sending a second message from the network device on the upstream connection to the second network requesting one or more of the available network services on the third network from the list of services from the first message; and receiving a third message on the second downstream connection from the second network on the network device indicating a status for one or more available network services requested by the network device in the second message.

2. A computer readable medium having stored therein instructions for causing a central processing unit to execute the steps of the method of claim 1.

3. The method of claim 1 wherein the first network is a cable television network, the second network is a public switched telephone network and the third network is a data network.

4. The method of claim 3 wherein the data network is any of the Internet or intranet.

5. The method of claim 1 wherein the first connection type is a cable television connection, the second connection type is a telephony connection and the third connection type is an Internet Protocol connection.

6. The method of claim 1 wherein the first message is management message for the network device including a list of network addresses for services available on the third network.

7. The method of claim 1 wherein the first message is a medium access control message, the second and third messages are an Internet Protocol messages.

8. The method of claim 1 wherein the network device is a cable modem.

9. The method of claim 1 wherein the first message contains a list of less than all of the services available on the third network.

10. The method of claim 1 further comprising:
receiving a third message from the third network on the first network and the second network in response to the second message sent by the network device; and
forwarding the third message to the network device only from the second downstream connection on the second network.

11. In a data-over-cable system including a network device connected to a first network with a first downstream connection of a first connection type, the network device connected to a second network with an upstream connection of a second connection type and connected to the second network with a second downstream connection of a second network type, the first network and second network connected to a third network with the third connection type, a method of managing network services, the method comprising the following steps:
receiving a first message from the first network on the second network including a list of services on the third network available to the network device;
storing the list of services available to the network device on the first network;
receiving a second message from the network device on the second network on the upstream connection, wherein the second message is a request for one or more services available on the third network;
determining whether the network device is allowed to request the more or more services in the second message available on the third network using the list of services, and if so,
forwarding the second message to the third network;
receiving a third message on the second network indicating a status for the one or more services requested by the network device in the second message; and
forwarding the third message from the second network over the second downstream connection to the network device.

12. A computer readable medium having stored therein instructions for causing a central processing unit to execute the steps of the method of claim 11.

13. The method of claim 11 further comprising:
determining whether the network device is allowed to request the one or more services available from the second message on the third network, and if not,
sending a fourth message over the second downstream connection to the network device, wherein the fourth message is a rejection message for one or more of the services available on the third network.

14. The method of claim 11 further comprising:
receiving a third message on the first network and on the second network, wherein the third message indicates a status for the one or more services requested by the network device in the second message; and
forwarding the third message only over the second downstream connection from the second network to the network device.

15. In a data-over-cable system including a cable modem connected to a cable television network with a downstream cable connection, the cable modem connected to a public switched telephone network with an upstream telephony connection and connected to the public switched telephone network with a downstream telephony connection, the cable television network and public switched telephone network connected to a data network, a method of managing network services, the method comprising the following steps:
receiving a first message from the cable television network on the downstream cable connection on the cable modem, wherein the first message includes a list of services on the data network available to the cable modem;
sending a second message from the cable modem on the upstream telephony connection to the public switched telephone network, wherein the second message includes a request for one or more of the available network services on the data network from the list of services from the first message;
forwarding the second message from the public switched telephone network to the data network;
receiving a third message on the public switched telephone network, wherein the third message indicates a status for the one or more services requested by the cable modem in the second message; and
forwarding the third message from the public switched telephone network over the downstream telephony connection to the cable modem.

16. A computer readable medium having stored therein instructions for causing a central processing unit to execute the steps of the method of claim 15.

17. The method of claim 15 further comprising:
determining whether the cable modem is allowed to request the one or more services available on the data network, and if not,
sending a fourth message over the downstream telephony connection to the cable modem, wherein the fourth message is a rejection message for one or more of the services available on the data network.

18. The method of claim 15 wherein the step of receiving a first message from the cable television network on the downstream cable connection on the cable modem includes receiving a first message from a cable modem termination system connected to the cable television network.

19. The method of clam 15 wherein the step of sending a second message from the cable modem on the upstream telephony connection to the public switched telephone network includes sending a second message from the cable modem on the upstream telephony connection to a telephony remote access concentrator connected to the public switched telephone network.

20. The method of claim 15 wherein the step of receiving a third message on the public switched telephone network includes receiving third message on a telephony remote access concentrator connected to the public switched telephone network.

21. The method of claim 15 wherein the step of receiving a third message on the public switched telephone network includes also receiving the third message on the cable television network.

22. The method of claim 15 further comprising:

forwarding the third message from the cable modem termination system over the downstream cable connection to the cable modem.

23. In a data-over-cable system including a cable modem connected to a cable modem termination system on a cable television network and connected to a telephony remote access concentrator on a public switched telephone network, the cable television network and public switched telephone network connected to a data network, a method of managing network services, the method comprising the following steps:

receiving a first message on the telephony remote access concentrator from the cable modem termination system, wherein the first message includes a list of services on the data network available to the cable modem;

sending a second message from the cable modem termination system to the cable modem on a downstream cable connection, wherein the second message includes a list of services on the data network available to the cable modem;

receiving a third message on the telephony remote access concentrator from the cable modem on an upstream telephony connection requesting one or more services on the data network;

determining on the telephony remote access concentrator with the list of services from the first message whether the cable modem is allowed to request the one or more services on the data network, and if so, forwarding the third message to the data network from the telephony remote access concentrator for the cable modem; and forwarding responses from the data network from the telephony remote access concentrator to the cable modem on a downstream telephony connection via the public switched telephone network, thereby allowing the cable modem to request one or more services on the data network without sending request messages or receiving responses through the cable modem termination system on the cable television network.

24. A computer readable medium having stored therein instructions for causing a central processing unit to execute the steps of the method of claim 23.

* * * * *